US011378502B2

(12) United States Patent
Bellemare et al.

(10) Patent No.: US 11,378,502 B2
(45) Date of Patent: Jul. 5, 2022

(54) MEASUREMENT OF MATERIAL PROPERTIES UNDER LOCAL TENSILE STRESS THROUGH CONTACT MECHANICS

(71) Applicant: Massachusetts Materials Technologies LLC, Waltham, MA (US)

(72) Inventors: Simon C. Bellemare, Weston, MA (US); Steven D. Palkovic, Somerville, MA (US); Brendon M. Willey, Dedham, MA (US); Phillip A. Soucy, Cambridge, MA (US)

(73) Assignee: Massachusetts Materials Technologies LLC, Natick, MA (US)

( * ) Notice: Subject to any disclaimer, the term of this patent is extended or adjusted under 35 U.S.C. 154(b) by 664 days.

(21) Appl. No.: 15/993,424

(22) Filed: May 30, 2018

(65) Prior Publication Data
US 2018/0275035 A1    Sep. 27, 2018

Related U.S. Application Data

(63) Continuation of application No. PCT/US2016/065960, filed on Dec. 9, 2016.
(Continued)

(51) Int. Cl.
*G01N 3/44* (2006.01)
*G01N 3/46* (2006.01)
(Continued)

(52) U.S. Cl.
CPC ............. *G01N 3/44* (2013.01); *G01N 3/46* (2013.01); *G01N 3/60* (2013.01); *G01N 19/06* (2013.01);
(Continued)

(58) Field of Classification Search
CPC .. G01N 3/60; G01N 3/46; G01N 3/44; G01N 2203/0066; G01N 19/06; G01N 2203/0053; G01N 2203/0078; G06N 5/04
See application file for complete search history.

(56) References Cited

U.S. PATENT DOCUMENTS 2,199,380 A     5/1940  Walraven
6,053,034 A *   4/2000  Tsui ................... G01Q 60/366
                                                    73/81

(Continued)

FOREIGN PATENT DOCUMENTS

DE      19616676 A1    11/1997
ES      2169634 A1     7/2002
(Continued)

OTHER PUBLICATIONS

Extended European Search Report—Application No. 16873981.1, dated Jun. 26, 2019, 7 pages.
(Continued)

*Primary Examiner* — Yoshihisa Ishizuka
(74) *Attorney, Agent, or Firm* — Sunstein LLP

(57) ABSTRACT

An apparatus for performing a contact mechanics test in a substrate includes a stylus having at least two contact elements. Each contact element has a contact profile, and the contact elements are disposed in the stylus to define a stretch passage therebetween. The stylus is configured to deform the substrate so as to cause the substrate to flow between the contact elements and induce tension in the substrate in order to generate and preserve micromodifications in the substrate. Methods of performing a contact mechanics test using the apparatus are also provided.

16 Claims, 17 Drawing Sheets

Related U.S. Application Data

(60) Provisional application No. 62/265,234, filed on Dec. 9, 2015.

(51) Int. Cl.
   *G01N 3/60*   (2006.01)
   *G01N 19/06*  (2006.01)
   *G06N 5/04*   (2006.01)

(52) U.S. Cl.
   CPC .......... *G01N 2203/0053* (2013.01); *G01N 2203/0066* (2013.01); *G01N 2203/0078* (2013.01); *G06N 5/04* (2013.01)

(56) References Cited

U.S. PATENT DOCUMENTS

| | | |
|---|---|---|
| 6,945,097 B2 | 9/2005 | Jardret et al. |
| 7,140,812 B2 | 11/2006 | Bryan et al. |
| 7,669,508 B2 | 3/2010 | Gardiner et al. |
| 2010/0281963 A1 | 11/2010 | Greer |

FOREIGN PATENT DOCUMENTS

| | | |
|---|---|---|
| GB | 2502989 A | 12/2013 |
| JP | H102814 A | 1/1998 |
| JP | 2003-344265 A | 12/2003 |
| JP | 2005-83924 A | 3/2005 |
| JP | 2014240851 A | 12/2014 |

OTHER PUBLICATIONS

International Search Report—International Application No. PCT/US16/065960 dated Feb. 28, 2017, together with the Written Opinion of the International Searching Authority, 18 pages.

International Preliminary Report on Patentability—International Application No. PCT/US16/065960 dated Jun. 21, 2018, 9 pages.

* cited by examiner

MEASUREMENT OF MATERIAL PROPERTIES UNDER LOCAL TENSILE STRESS THROUGH CONTACT MECHANICS

CROSS REFERENCE TO RELATED APPLICATIONS

The present application is a continuation application of International Application No. PCT/US2016/065960 filed Dec. 9, 2016, which claims the benefit of U.S. Provisional Patent Application No. 62/265,234 filed Dec. 9, 2015, the disclosures of which are incorporated by reference herein in their entirety.

TECHNICAL FIELD

The present invention relates to the use of contact mechanics to gain data and information related to how a material resists micromodifications when subjected to a stress field that includes tensile stresses in at least one direction.

BACKGROUND ART

U.S. Patent Application Publication No. 2016/0258852 entitled "Contact Mechanic Tests Using Stylus Alignment to Probe Material Properties" describes the background art and is incorporated by reference herein in its entirety. Specifically, the publication describes the use of an alignment mechanism and engagement mechanism to perform a frictional sliding test.

For safe engineering design, engineers must consider the demand on a structure and its capacity. For strength based design, the demand is the maximum stress in the structure and the capacity is the maximum strength that the material can resist before it fails. The maximum stress on the structure can be solved based on the specimen geometry and loads. The material strength is traditionally obtained through laboratory tensile tests which allows for the measurement of the yield strength that describes the onset of permanent plastic strain and the ultimate tensile strength that precedes failure.

However, strength based design omits key features that control how materials fail. A material's strength is a function of flaws or cracks within the material volume. At these flaws, the stress is magnified compared to the bulk of the material. Thus, a material with a large crack will exhibit a reduced strength compared to a material with a smaller crack. To consider the capacity of a material containing internal flaws, an engineer must consider fracture mechanics. In fracture mechanics, the demand is the crack driving force for crack extension, and the capacity is the fracture toughness describing the material's ability to resist the growth of a crack. Equivalent names for the crack driving force are the energy release rate, J-integral and stress intensity factor. Fracture toughness is the material capacity that describes the energy needed to advance a crack by a unit area, and must be measured experimentally. Related terms for fracture toughness include fracture energy, critical energy release rate, and critical stress intensity factor. For many materials, the fracture toughness of the material is not constant and is a function of crack extension. This function is commonly known as a resistance curve (R-curve). Specific features of the R-curve that are important to engineers are the initiation fracture energy for a crack to first extend and the maximum steady-state fracture energy.

The measurement of fracture toughness for ceramics, composite, polymers and metals has been performed for decades, and consists of loading a specimen in a laboratory with a pre-existing flaw of known geometry to failure. Standard test methods for simple geometries such as compact tension (CT) and single-edge notched beams (SEB) are detailed in ASTM E1820 "Standard Test Method for Measurement of Fracture Toughness". The interpretation of results is dependent on the material and specimen geometry. At the crack-tip, complex behavior occurs within a fracture process zone which is dependent on the material system. When the size of the fracture process zone is small compared to the crack size and the specimen geometry, small-scale yielding conditions are met. The crack driving force is then a function of load, crack geometry, and specimen geometry which can be found in engineering handbooks for most engineering applications. The crack driving force at failure can then be related to the material's fracture toughness using linear elastic fracture mechanics (LEFM). However, for materials with high fracture toughness such as aluminum or steel, the fracture process zone is large and meeting small-scale yielding conditions would require specimen sizes that are too large to be feasible in practice, requiring the use of elastic-plastic fracture mechanics (EPFM). With EPFM, the crack driving force is now a function of load, crack geometry, specimen geometry and plastic material properties. This more complex function is typically found numerically through finite element analysis, or experimentally through instrumentation that precisely measures features of the growing crack such as the crack-tip opening displacement (CTOD). For the case of ductile metals, the plastic behavior is described by two additional material properties, the yield strength and strain hardening exponent. The yield strength controls the stress at which plasticity first occurs and the strain hardening exponent describes the rate at which the material flows. For several polymers, engineers and scientists have studied and quantified in the laboratory the process zone that is located ahead of the crack tip where shear loading, void formation, and crazing can occur.

The fracture toughness experiments described above are destructive tests which can only be performed in a laboratory, are expensive, and require specialized equipment to monitor the dimensions of a growing crack under loading. Because of cost and turnaround time, less sophisticated tests, such as Charpy impact or Charpy V-notch (CVN), are being more widely used for quality control, especially for steel products. CVN testing uses a standardized test sample containing a pre-existing notch that is hit with a hammer to induce fracture. The test probes the energy needed to fracture a ligament of material under high strain-rates. The CVN value provides an index that can be used to comparatively rank materials based on some measure of toughness. Empirical relationships with fracture toughness used in LEFM or EPFM can be established, but their accuracy and transferability is limited. CVN has also been used to identify ductile-to-brittle transitions by testing a series of samples at different temperatures and examining the broken halves to measure relative amounts of ductile and brittle processes. This value is critical for engineering applications where lower service temperatures could lead to a greater risk of crack propagation.

Information on the behavior at low temperatures and the precise knowledge of the fracture resistance of materials is important for many applications. This includes service life predictions based on damage resistance models, such as sub-critical fatigue crack propagation. This large industry effort is part of providing an optimal compromise between safety, reliability, and efficiency. In some cases, the load on the structure or component can be essentially constant and the sub-critical crack advance is through creep or stress-corrosion cracking.

There have also been efforts to use contact mechanics to probe fracture processes. Contact mechanics uses a hard stylus to generate significant local deformation where it contacts a substrate leaving the bulk material unchanged. This approach has been traditionally used to measure strength properties through indentation hardness testing. More recently, tensile stress-strain properties such as yield strength, strain hardening exponent, and ultimate tensile strength can be measured using automated ball indentation or frictional sliding. For fracture resistance, Akono et al. have investigated the ability to use a cutting tool to measure fracture toughness within a surface layer of material. The crack driving force function is calculated by assuming a crack propagates in-front of the cutting tool. These assumptions are not well supported for ductile metals where significant plastic deformation occurs near contact. Others have considered using "machining" as a method to estimate fracture toughness. One approach sought is to differentiate the energy of deformation from the energy of separation by varying the depth of penetration during the test. These machining concepts are not widely used in practice because the stress-strain field induced in the material consist of large hydrostatic compression and shear, which differs from the traditional tensile crack-opening mode that leads to many material failures.

SUMMARY OF THE EMBODIMENTS

In one embodiment of the invention, an apparatus for performing a contact mechanics test in a substrate includes a stylus having at least two contact elements. Each contact element has a contact profile, and the contact elements are disposed in the stylus to define a stretch passage therebetween. The stylus is configured to deform the substrate so as to cause the substrate to flow between the contact elements and induce tension in the substrate within the stretch passage to generate and preserve micromodifications in the substrate.

In related embodiments, the stylus may be further configured to generate and preserve the micromodifications in multiple orientations, which may include (a) an opening that is either normal or transverse to an undeformed surface of the substrate as the stylus travels parallel to the undeformed surface, and/or (b) an opening that is normal or transverse to the direction of travel during an indentation mode. The apparatus may further include an engagement mechanism coupled to the stylus and configured to provide movement of the stylus in a frictional sliding mode or indentation mode. The apparatus may further include at least one engagement mechanism coupled to the stylus and configured to provide movement of the stylus, and an alignment mechanism coupled to the at least one engagement mechanism and configured to establish an orientation and/or position of the stylus relative to the substrate. The apparatus may further include at least one engagement mechanism coupled to the stylus and configured to provide movement of the stylus, and a substrate surface measurement device, coupled to one or more of the at least one engagement mechanism, to measure characteristics of the substrate surface associated with the micromodifications as the stylus travels.

In another embodiment of the invention, a method for performing a contact mechanics test on a substrate includes providing a stylus as described above, causing the stylus to engage against the substrate, and moving the stylus to perform a contact mechanics test to generate a residual substrate surface in the substrate and to preserve the residual substrate surface, the residual substrate surface having micromodifications.

In related embodiments, the method may further include measuring characteristics of the residual substrate surface associated with the micromodifications in the substrate. The method may further include measuring reaction forces on the stylus as the stylus generates the micromodifications in the substrate. The method may further include providing an additional stylus without a stretch passage, causing the additional stylus to engage against the substrate, and moving the additional stylus to generate a substrate response. The method may further include measuring characteristics of the substrate surface associated with the micromodifications in the substrate or measuring reaction forces on the stylus, and utilizing the measurements of the substrate surface associated with the micromodifications and/or the reaction forces in predictive algorithms to determine mechanical properties of the substrate related to its resistance to micromodification initiation and propagation. The method may further include using plastic material properties in determining the resistance to micromodification initiation and propagation. The method may further include measuring characteristics of the substrate surface associated with the micromodifications in the substrate or measuring reaction forces on the stylus, and using the measurements of the substrate surface and/or the reaction forces to compare with numerical models that characterize stress-strain field based on material properties and stylus geometry in order to develop predictive algorithms. The method may further include measuring characteristics of the substrate surface associated with the micromodifications in the substrate, and using an empirical database to associate the measurements of the substrate surface with mechanical properties of the substrate. The method may further include using temperature and/or stylus velocity in order to determine a ductile-to-brittle transition. The method may further include repeating the steps of claim 1 with different stylus penetration depth and/or stretch passage width in order to assess influence of material constraint on the substrate related to its resistance to micromodification initiation and propagation. Moving the stylus to perform the contact mechanics test on the substrate may be performed in an indentation mode and/or a frictional sliding mode.

In one embodiment of the invention, an apparatus for performing a contact mechanics test on a substrate that comprises a stylus having a contact profile configured to deform the substrate by generating microstructure changes, microvoid formation, cracking or other changes in the substrate. Some of these micromodifications remain in the residual substrate surface after the stylus is removed. The stylus generates a stretch zone shaped to engage against the substrate and promote tensile stresses in at least one direction. In another embodiment, the stylus further comprises a stress passage that further facilitates the generation of a zone of tension and/or helps to preserve the micromodifications after their formation. In other embodiments, the stylus is coupled to an engagement mechanism that is configured to maintain the penetration of the stylus within the substrate, an engagement mechanism configured to move the stylus relative to the substrate surface, an alignment mechanism configured to maintain a desired orientation of the stylus with respect to the substrate, and/or a substrate surface measurement device containing one or more instruments to measure characteristics of the residual substrate surface.

In one embodiment of the invention, a method for performing a contact mechanics test on a substrate which includes providing a stylus having a leading portion and a contact profile configured to deform the substrate, causing the stylus to engage against the substrate, and moving the stylus to generate micromodifications in the substrate and form a residual substrate surface. The contact mechanics test may be in an indentation mode where the stylus is pressed perpendicularly into the substrate surface or a frictional sliding mode where the stylus travels along the substrate surface. In another embodiment, the method includes measurements of the characteristics of the residual substrate surface associated with the micromodification in the substrate. In a further embodiment, these measurements are utilized in predictive algorithms to determine mechanical properties of the substrate, including fracture toughness or Charpy values. The predictive algorithms may be based on empirical databases established through correlations between the contact mechanics test and traditional experiments, or numerical models that characterize the residual strain field based on a given set of parameters including material properties, stylus geometry, and contact conditions. Another embodiment of the method further comprises the decoupling of mode I and mode II fracture toughness through analytical or numerical models of the micromodification process.

In another embodiment, the stylus may engage the substrate and cause the material to fracture from the substrate forming a separate ribbon or chip similar to a machining process. This piece of material removed may be utilized for further analysis using traditional experimental methods to test for chemistry, hardness, or other mechanical properties.

BRIEF DESCRIPTION OF THE DRAWINGS

The foregoing features of embodiments will be more readily understood by reference to the following detailed description, taken with reference to the accompanying drawings, in which:

FIG. 2A is a schematic side view of the contact mechanics test. FIGS. 2B-2E are schematic section views of FIG. 2A.

DETAILED DESCRIPTION OF SPECIFIC EMBODIMENTS

Figure 1A:
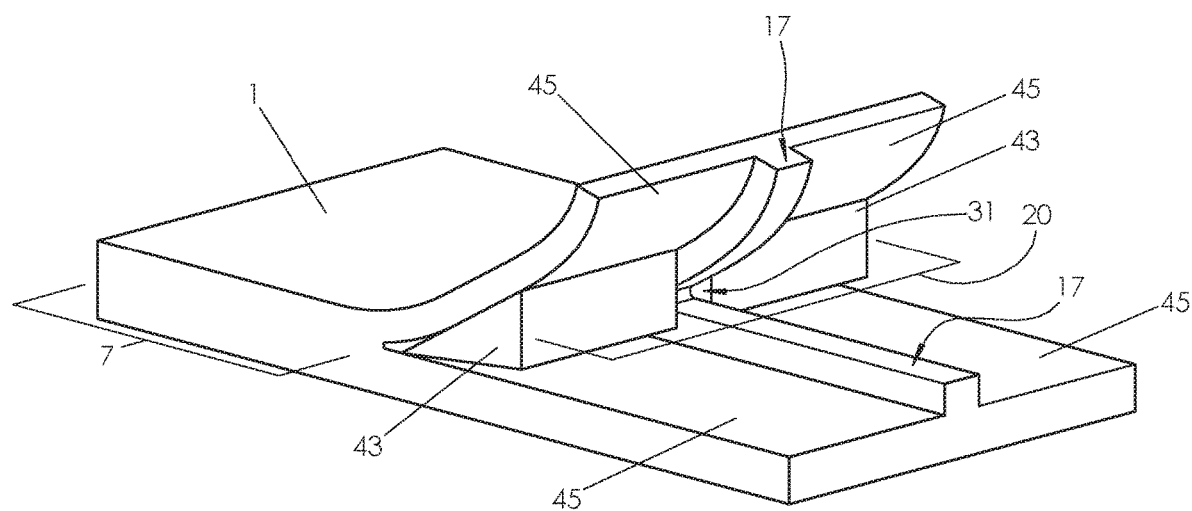
FIG. 1A-B are schematics of isometric views of the flow of material on a certain section of a stylus with a contact profile that induces a stretch zone, above or below the section shown, where tensile stresses are generated, during and after the contact mechanics test, respectively, according to embodiments of the present invention.

Definitions. As used in this description and the accompanying claims, the following terms shall have the meanings indicated, unless the context otherwise requires:

A "substrate" is the material probed for mechanical properties through a contact mechanics test.

To "deform" or producing "deformation" includes making a permanent or time-dependent change in the substrate, including by removal of material from the substrate.

A "stylus" is an element engaging the substrate.

A "contact element" is a component of a stylus that engages with the substrate. A stylus may contain more than one contact element. A contact element has a "contact profile", which is a profile that is shaped to induce flow in the substrate. A contact profile may be straight, sloped, convex, concave, continuous or discontinuous depending on the intended deformation mode of the substrate. A contact element may consist of one or more contact profiles.

A "contact mechanics test" is the use of localized deformation to probe the mechanical response of a material while the rest of the structure remains unchanged. Specific implementations include an "indentation test" where a hard stylus deforms the surface of a softer substrate by moving perpendicular to the substrate surface. Another implementation is a "frictional sliding test" where a hard stylus deforms the surface of a softer substrate while moving the stylus along a path trajectory. The contact mechanics test may be in an indentation mode, where a stylus is pressed into the substrate, and/or a frictional sliding mode, where the stylus travels laterally along a substrate surface.

A "path trajectory" is the physical path and relative orientation of the stylus with respect to the substrate that the stylus follows during a contact mechanics test.

A "residual substrate surface" is the surface of the substrate that includes a characteristic that remains in the substrate, or a change in the substrate, after a contact mechanics test. Each residual substrate surface may contain,
  (i) a "microcrack" which is the creation of new surfaces in the substrate having an initiation position, length, and direction,
  (ii) a "microstructural change" which is any change in the internal structure of the material. This includes, but is not limited to, the volume fraction of each crystalline structure, crystallographic and molecular texture, the free volume in the material, and the molecular arrangement,
  (iii) a "microvoid" which is the creation of additional space in the material such as crazes, interface debonding, and other phenomena generally associated with tension in the material, and
  (iv) a "micromodification" which is any combination of microcracks, microvoids, or other change in the substrate. Micromodifications include microstructure changes, microvoid formation, cracking, and macrostructural changes, such as changes in the height and/or width of the substrate surface near the stylus, due to the contact mechanics test. Tensile stress is generated with a stylus designed to stretch the material and promote the formation of the micromodifications.
  (v) a "ligament" is a portion of the material that formed, or remained on the substrate surface, due to the presence of a stretch passage during the contact mechanics test.

A "residual substrate surface measurement device" is an apparatus configured to allow for the measurement of one or more characteristics of the residual substrate surface.

An "attack angle" or "rake angle" is the relative contact angle between the substrate and apparatus as the apparatus engages the substrate to perform a contact mechanics test. Contact mechanics have shown that the greater the attack angle the greater the amount of deformation. For a spherical stylus or a curved stylus, the attack angle is where the stylus engages with the non-contacting substrate surface and it, therefore, varies with the penetration depth. The "rake angle" is measured from the vertical orientation and is found by subtracting the attack angle from 90 degrees.

A "relief" is a portion of the contact element that was removed in order to reduce the contact angle and, as a result, reduce friction, surface wear, stylus wear, or other undesirable phenomena which occur during a contact mechanics test. A relief can be characterized by a "relief angle," which is the included angle of a void created by the relief when it is created by rotating the stylus away from the substrate.

A "stretch passage" is a geometrical detail of the stylus that allows for generating and preserving the micromodification. The stretch passage may be inherent to a stylus or may be formed by the separation between two or more contact elements.

A "contact element link" is a structural member connecting two or more contact elements. The contact element link may serve as an additional contact profile in embodiments in which it engages and causes further deformation or translation of the substrate. When the contact element link forms a stretch passage by joining two or more contact profiles, the separation distance, and therefore stretch passage width, may be adjustable via a threaded connector, piston, or spacer.

A "crack driving force" is a general name for the demand on a substrate from the perspective of fracture mechanics. In engineering literature, the crack driving force is also known as the energy release rate, stress intensity factor and J-integral.

A "fracture toughness" is a general name for the capacity of a substrate to resist the growth of micromodifications. Within this application, we refer to similar material capacities as "micromodification resistance" or "resistance to micromodifications." In engineering literature, the fracture toughness may be referred to as the critical energy release rate, critical stress intensity factor, and critical J-integral. Additional related terms are the surface energy for perfectly brittle materials and fracture energy for materials that undergo inelastic dissipation. When the fracture toughness is not constant, but is a function of micromodification extension, it is known as a resistance curve (R-curve or J-curve). Another empirical measurement of fracture toughness is the CVN energy from Charpy Impact tests (or Charpy V-Notch) that can be used as an index for ranking materials of similar specimen size and testing conditions.

Overview of Apparatus, Methods and Applications

Contrary to most common techniques currently used to characterize the fracture resistance of a material, the exemplary apparatus and methods characterize the resistance of a material to microstructural changes and/or micromodification formations when the stress field has tension in at least one of the local principal axis directions and does not require the extraction of a material sample. Engineering applications often require knowledge of the micromodification initiation and micromodification propagation resistance of a material, such as safe life and damage tolerance design. Cracking resistance in many cases relates to the localized plasticity, microvoid formation and coalescence and/or specific micromechanisms including grain boundary cracking, cleavage, stress corrosion cracking and fatigue. Therefore, data from the resistance to form a micromodification would help supplement what can be obtained in condition assessment or quality control without removing a sample. One important parameter is the direction of nominal loading. For wrought products, this is commonly defined as longitudinal, transverse and short transverse with respect to the plane of rolling or forming. For pipes and rolled products, this is commonly defined as longitudinal, circumferential, and radial with respect to the axis of the cylinder. With different variations of the technique, the test can characterize the changes in micromodification resistance in different orientations. The apparatus can function in indentation mode or in frictional sliding mode to accommodate the specific application.

Figure 1B:
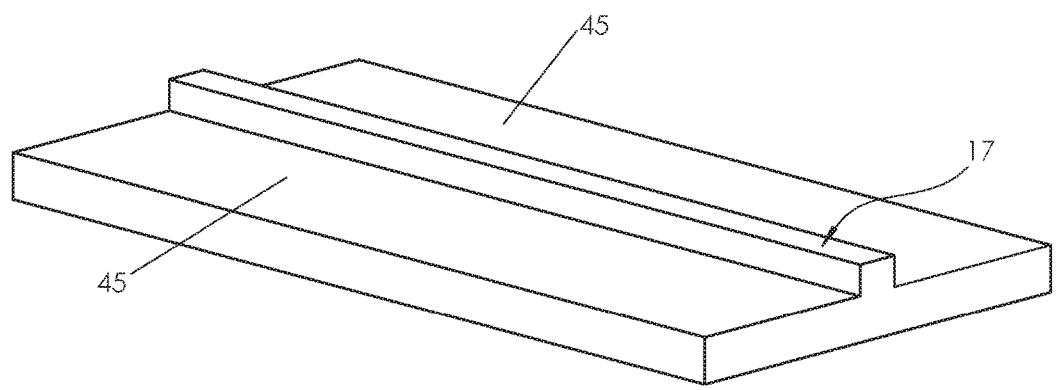

According to embodiments of the present invention, a micromodification is generated through a contact mechanics test with a specially designed stylus, the stylus having one or more contact elements, and each contact element having a contact profile that induces a stress field with tension along at least one axis as the stylus deforms the substrate. This is shown generally in FIG. 1A-B, where a stylus 20 is used to generate and preserve a micromodification in a substrate material 1. Initially, upstream of the stylus is undeformed substrate material 7. In this exemplary embodiment, the stylus 20 contains two contact elements 43, each with contact profiles that are shaped to deform the substrate material 1 as the stylus 20 travels, with a stretch passage 31 therebetween. The action of the stylus 20 generates significant tensile stress and strain, creating a micromodification that can initiate microvoid formation and coalescence or more brittle processes. The formation of a micromodification involves the creation of new surfaces 45, with opposing faces containing a residual substrate surface 17 that contains signatures of the micromodification. After this point, the stylus can preserve some aspect of the residual substrate surface 17 so that it can be subsequently characterized using a residual substrate surface measurement device which measures some characteristics of the residual substrate surface 17. The reaction forces on the stylus 20 as it deforms the material and generates micromodifications may also be measured. The characteristics of the residual substrate surface and/or forces on the stylus 20 can be related to a materials resistance to micromodification initiation and propagation.

In addition to the novel apparatus, several embodiments implement methods to correlate reaction forces and/or characteristics of the residual substrate surface to the micromodification resistance of the substrate material. A potential application includes the characterization of material surfaces for an indicator of their resistance to cracking under different conditions. Therefore, the results from testing can be used as an estimate of the material fracture toughness as defined by fracture mechanics. In one embodiment, the results are used as an index of micromodification resistance that may be used to semi-quantitatively rank materials. This approach is widely employed through indentation hardness measurements that provide an index of material strength. There are other situations where correlation with other material properties that relate to micromodification resistance are used for comparing and evaluating materials. For example, embodiments of the wedge-shaped profile with a stretch passage can be used to monitor the onset of microvoid formation. It can also be used to correlate with traditional laboratory tests, such as the R-Curve or Charpy Impact/V-Notch Energy (CVN). The characteristics of the residual substrate surface obtained through embodiments of the present invention can also be correlated to these additional material parameters. Test conditions, such as temperature and strain rate, can be modified to assess the micromodification resistance under different loading environments. The proportion of tension (Mode I) and shear (Mode II) loading as well as the local stress-strain field and magnitude of plastic strain near micromodifications can be altered by varying geometrical aspects of the stylus. With geometrical changes in the stylus and depths of penetration, the fracture resistance of materials may be expressed as a function of material thickness to account for material constraint effects that explains transitions from plane stress to plane strain conditions.

The applications for this test span across industries using structural materials including energy, manufacturing, transportation and communication. A major advantage of the technique is that it only requires a very small sample and can be performed in a nondestructive way by probing only the surface characteristics of a structure. The depth or length of the substrate tested can be varied to control the volume of material tested. Embodiments of the present invention may be readily combined with a testing platform to enable portable measurements in field environments, such as on the outer surface of pipes or I-beams, as described in U.S. Patent Application Publication Nos.: 2014/0373608, entitled "Scratch Testing Apparatus and Methods of Using Same" and 2016/0258852, entitled "Contact Mechanics Tests using Stylus Alignment to Probe Material Properties" and U.S. patent application Ser. No. 15/256,276, entitled "Contact Mechanics Tests using Stylus Alignment to Probe Material Properties" which are incorporated by reference herein in their entirety.

For a given industry, embodiments of the present apparatus and method can be used in quality control at a factory, in quality assurance during delivery, in construction quality assurance (such as on-site welding), in condition assessment, and for material verification of existing structures. Embodiments for use at the factory could be part of continuous monitoring for other applications, and whether the test fully qualifies as non-destructive will depend on the test location and the service conditions of the final product. For testing of new products, areas subjected to less stress or areas that are being fusion welded will be preferred. For existing structures that have experienced metal loss by corrosion or material degradation, such as chemical modification cracking, additional testing outside the affected areas or structural reinforcement may be necessary after completion of the test.

Detailed Description of the Apparatus

Embodiments of the present invention involve a stylus which is designed to deform a substrate material to generate a stress field with tension in at least one of the local principal axis directions that 1) induces a micromodification and 2) preserves characteristics of the micromodification on the residual substrate surface. The stylus may be a part of a system that translates and orients the stylus as it deforms the substrate. The system may also include additional components that perform measurements related to the reaction forces on the stylus and/or the characteristics of the residual substrate surface. The system may be part of a laboratory device that holds samples for testing, or may be part of a portable device that attaches directly to an existing structure for testing.

Specific Embodiments of the Stylus

In some embodiments, a stretch passage is included as a component of the stylus. A stretch passage can simply be a cut in the stylus that is sufficiently small to prevent the free flow of substrate material, but large enough to allow the formation of a ligament that will deform in tension sufficiently to cause a micromodification or to the point of fracture. In another embodiment, the stretch passage is a geometric feature that preserves the characteristics of a micromodification as the stylus deforms the substrate. In this case, the geometrical feature prevents alteration of the material signature that would otherwise occur through direct contact between the stylus and the micromodifications. In another embodiment, the stretch passage is formed by the separation between one or more contact elements. The separation between one or more contact elements may be defined by a contact element link, and may be adjustable to obtain multiple tensile loading configurations.

In some embodiments, the general stylus geometry is defined by traditional machining tool geometry. A stylus designed in this manner may be designed with a rake angle, which defines the contact element and contact profile, and at least one relief angle. Styluses with smaller rake angles (nearly perpendicular to the substrate surface) provide a faster rate of tensile stress in the ligament as material flowing around the stretch passage is pushed up the contact profile. In addition, material in front of the stylus will be experiencing larger shear and hydrostatic compression. The rake angle is determined based on the desired combination of tensile strain rate in the ligament and substrate shear while flowing. For a specific material and purpose, the stylus configuration can be optimized via experiments or numerical simulation, such as finite element analysis. The relief angles are determined based on the path trajectory of the stylus and the anticipated locations of wear.

Figure 2A:
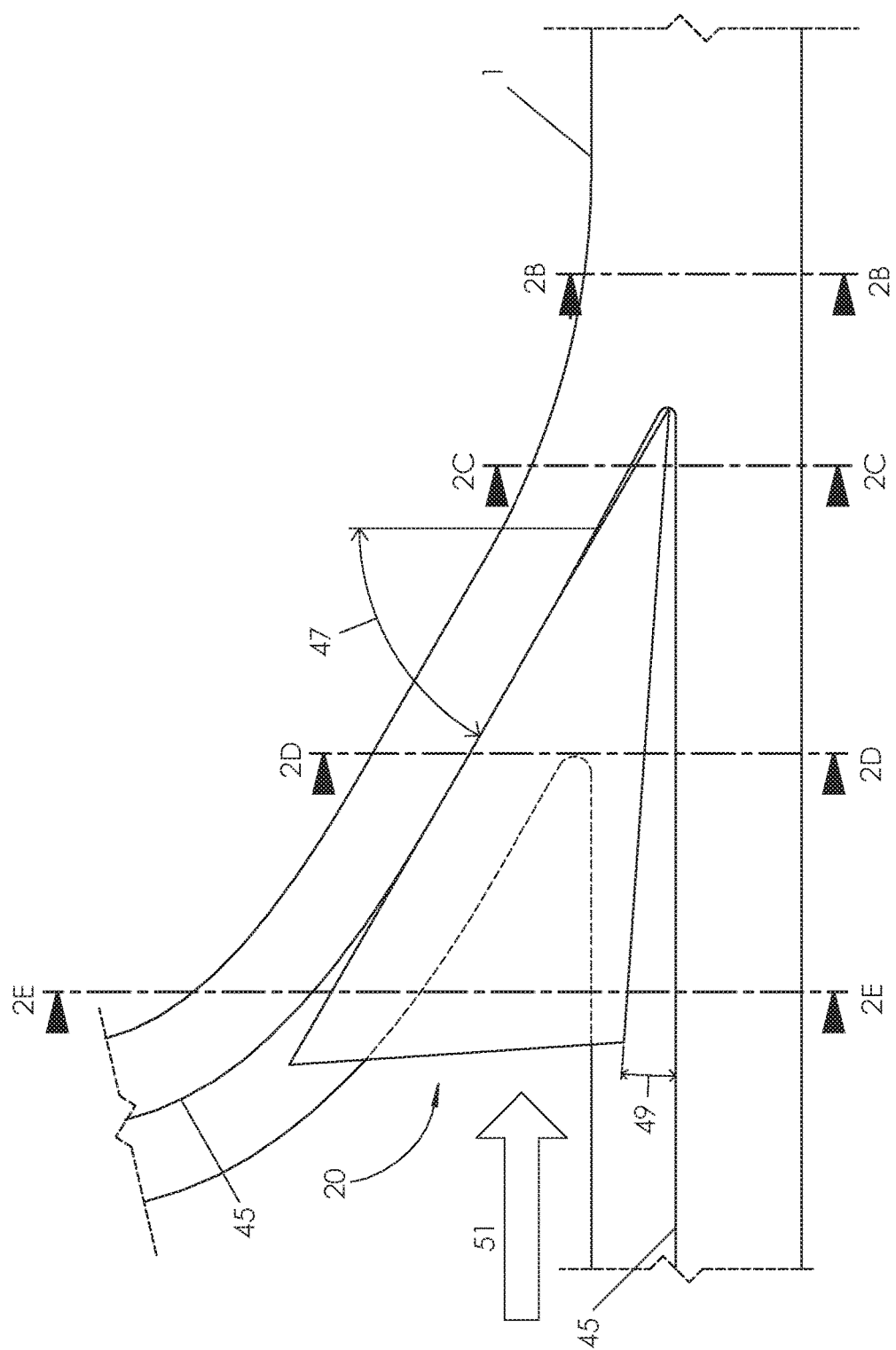
FIG. 2A-E are schematics of various views during the development of micromodifications that may form during a contact mechanics test using a stylus with a stretch passage according to embodiments of the present invention.
Figure 2B:
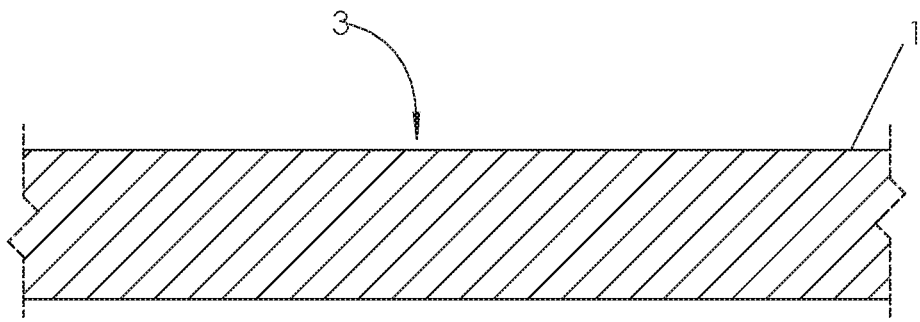
Figure 2C:
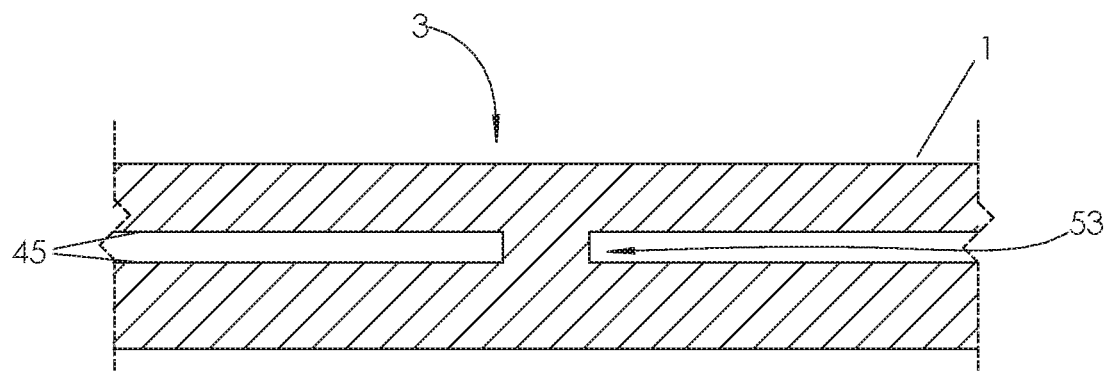
Figure 2D:
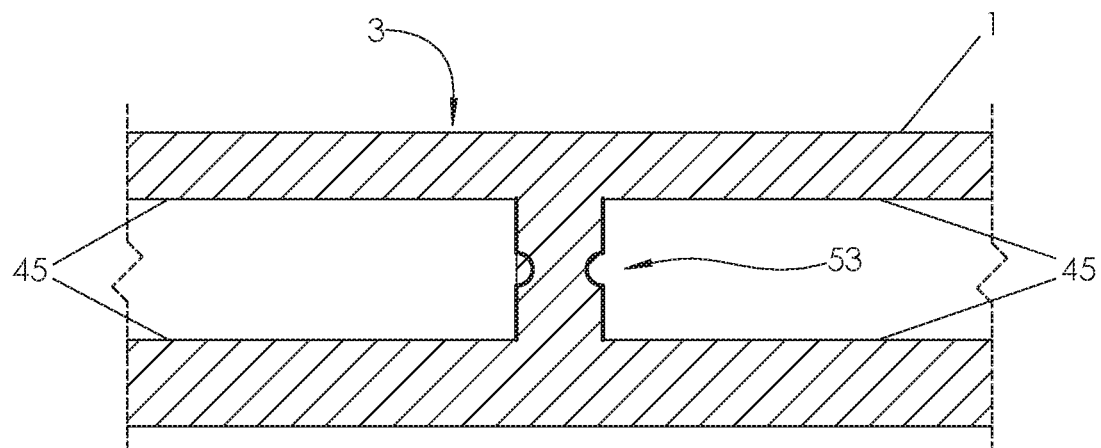
Figure 2E:
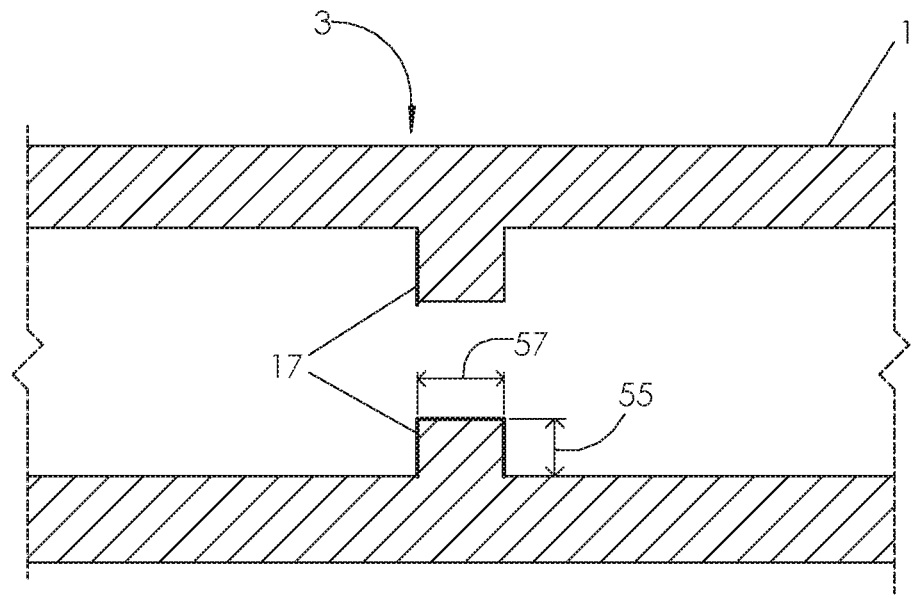

Referring to FIG. 2A-E, an embodiment of a stylus 20 which contains a stretch passage is shown during a contact mechanics test and operating in a frictional sliding mode. The stylus 20 is designed using a positive rake angle, 47, and positive relief angle, 49. FIG. 2B shows the undeformed substrate material 7 ahead of the stylus path trajectory 51. When the stylus engages the undeformed substrate material 7, the contact profile begins to separate the substrate material 1, resulting in new surfaces 45, and the initiation of a ligament 53, as shown in FIG. 2C. As the stylus continues to move along the path trajectory 51, the ligament 53 is stretched in tension due to the opposing forces of the contact element and substrate material 1, similar to a tensile coupon (FIG. 2D), until ultimately a micromodification forms resulting in two residual substrate surfaces 17 (FIG. 2E). In this case, the residual substrate surface can be characterized by a residual surface height 55 and residual surface width 57. If the behavior of the substrate is ductile, the conditions would be similar to the condition at final fracture of a tensile test specimen (within the middle of the neck zone). Because of the stretch passage, the residual substrate surfaces 17 of the unloaded ligament that remains are prevented from further deformation, to allow for possible later examination with a residual substrate measurement device.

Figure 3A:
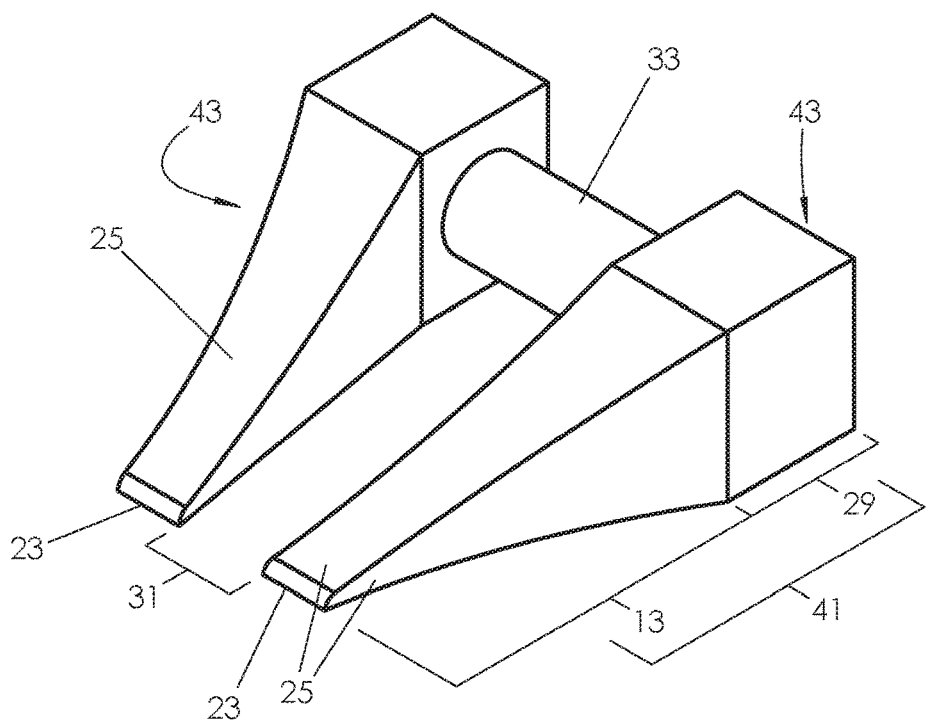
FIG. 3A-B are schematics of isometric and top views, respectively, that shows a stylus with a stretch passage, consisting of two contact profiles, and a connecting wedge link which forms a stretch passage according to embodiments of the present invention.
Figure 3B:
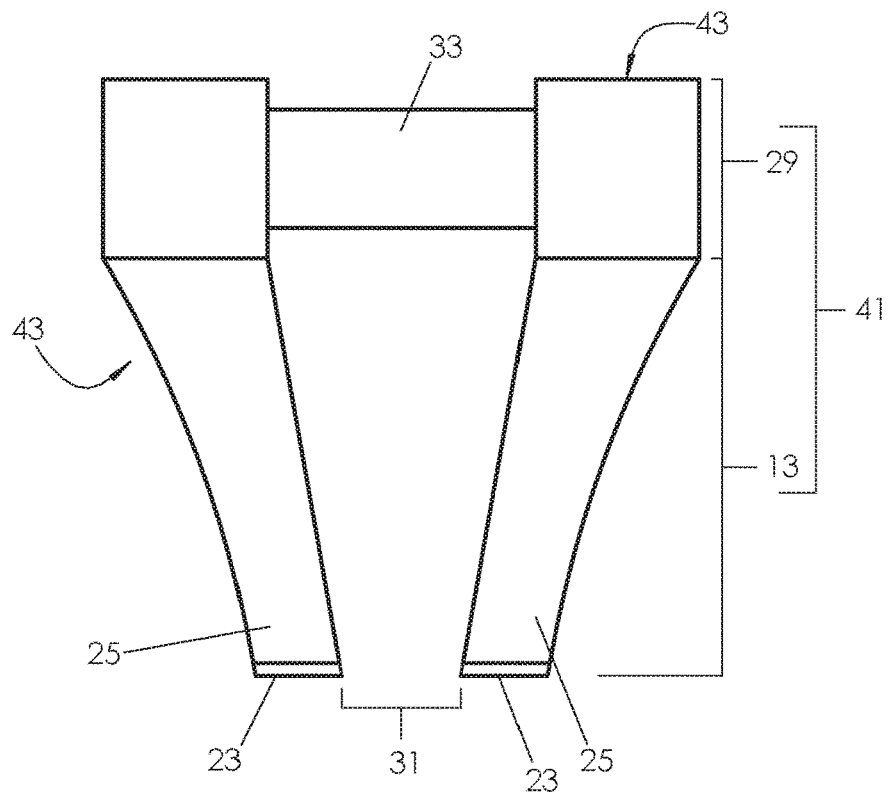

An embodiment of a stylus which contains a stretch passage 31 is shown in FIG. 3A-B. The stylus includes two contact elements 43, each contact element 43 containing a contact profile 41 with leading edges 23 and trailing faces 25 that make up the stretch zone 13 and subsequent optional preserving zone 29. The stylus engages the substrate and deforms the material laterally away from the stylus as the material passes the stretch zone 13. The stretch zone 13 gradually generates tensile stresses in the material and, in this embodiment, its contour is curved, though it may also be straight or increase in steps to control the rate and direction of material flow. In this embodiment, the stretch passage 31 is formed by the gap between the two contact elements 43, which are connected by a contact element link 33. The contact element link 33 may be permanently set, adjustable, or an internal part of the stylus that contains all the elements within a single component. Increasing or decreasing the contact element link 33 length will change the size of the stretch passage 31, altering the magnitude of deformation induced within the material. A wider stretch passage will result in more material volume being tested at the same time, which reduces size dependence on the fracture behavior. However, this benefit is counteracted by also having to account for more plastic deformation due to flow within the stretch passage 31. In another embodiment, the edges of the stylus may be straight and in simple triangles to allow for simple manufacturing using machining techniques such as focused ion beam milling or additive manufacturing through laser sintering or other lithography techniques. An advantage of additive manufacturing is that sensors can be embedded in the stylus. The shaping of the stylus will also affect the state of stress between a plane stress and plane strain condition. Material constraint has a well-known effect on micromodification resistance, with larger resistance for plane stress conditions. In some embodiments, the contact element link 33 is placed sufficiently downstream of the leading edge 23 such that the material will fail in tension and separate prior to reaching the contact element link 33. In the embodiment shown in FIG. 3A-B, as substrate material flows around the stretch passage 31, free surfaces are created, which localizes tensile stresses at the ligament joining opposing surfaces. This promotes fracture from the spreading action and forms a residual substrate surface containing a micromodification that can be subsequently characterized.

Figure 4A:
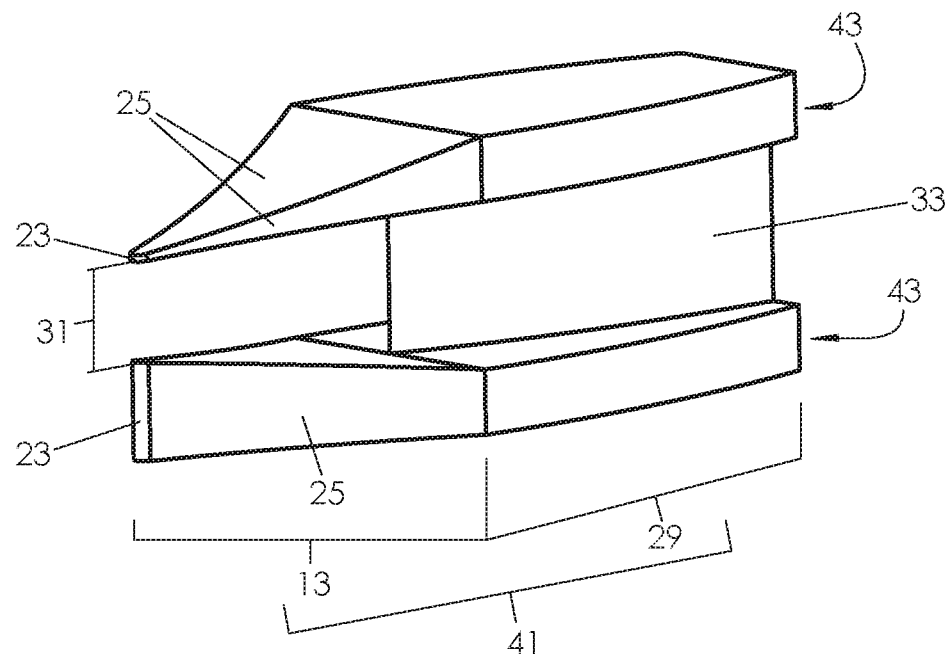
FIG. 4A-B are schematics of isometric and top views, respectively, that shows an alternative embodiment of a stylus with a stretch passage, and a connecting wedge link that is recessed to also act as a preserving passage according to embodiments of the present invention.
Figure 4B:
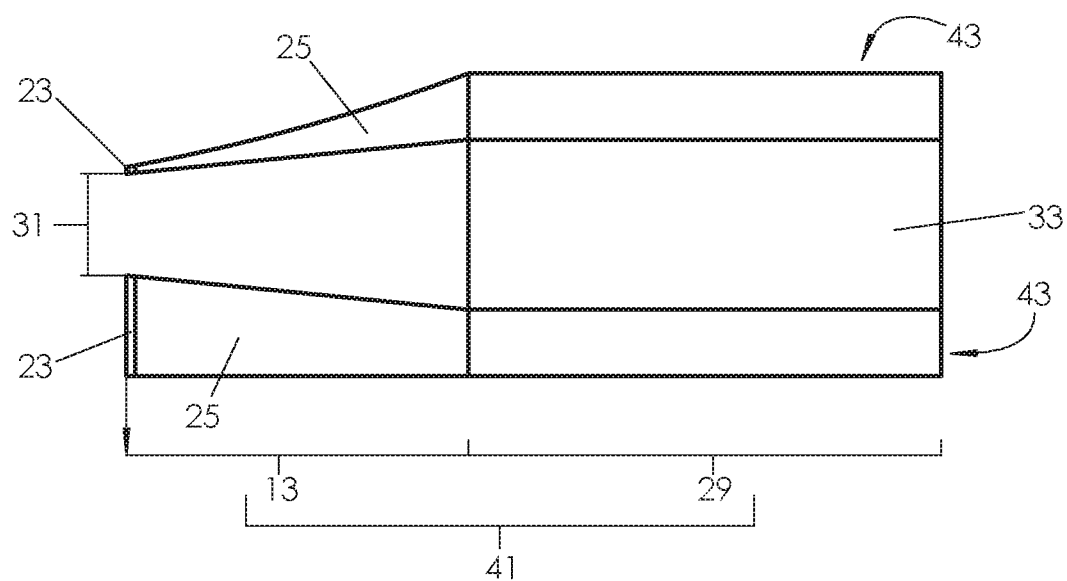

An alternative embodiment of a stylus geometry with a stretch passage is shown in FIG. 4A-B. The features of the stylus and their functions, as shown in FIG. 3A-B, are retained, including the leading edges 23, trailing faces 25, stretch zone 13, preserving zone 29, stretch passage 31, and contact element link 33, and contact element 43. In this embodiment, the contact element link 33 is recessed to preserve the micromodification on the residual substrate surface. This embodiment induces micromodifications in the direction transverse to the direction of travel in a frictional sliding experiment. The use of different stylus geometries to control the direction of the fracture process allows for the measurement of micromodification anisotropy in the substrate material.

In another embodiment, a micromodification is generated with a specially designed stylus utilizing a contact profile to gradually induce a stress field with tension along at least one axis as the stylus probes the substrate as material flow is initiated on both sides of the wedge. This is shown generally in FIG. 5, where the flow of substrate material 1 is shown along specific regions of a stylus with a stylus 20 that does not include a stretch passage. The resulting tensile stress is also shown as the stylus deforms the material. Initially, the material upstream of the stylus is in undeformed substrate material 7. As the stylus travels, the substrate material 1 is compressed and forced to begin moving around the contact profile 41 in a ductile plowing deformation mode. This region is defined as the upstream deformation region 9. After the leading point 11 of the stylus 20 has passed, the material reaches the contact profiles 41. The contact profiles 41 each include a stretch zone 13, where the substrate material is stretched in tension in at least one principal stress direction, resulting in an increasing magnitude of tensile stress 19 and strain. As the distance 18 along the contact profile 41 increases, the stress and strain in the substrate material 1 continue to increase until, at a given combination of accumulated strain and multi-directional stress state, a micromodification initiates. Substrates with different properties will start to initiate the micromodification at a different location under or around the stylus at or near the stretch zone 13. The higher the resistance to fracture, the further back, under or around the stylus the micromodification will be. Following the apex of the stretch zone 13, the stretching deformation is reduced and the material elastically unloads to decrease the magnitude of tensile stress 19 and strain at the elastic recovery region 15 of the contact profile 41. After exiting the elastic recovery region 15, the substrate material 1 is left with a residual substrate surface 17 containing signatures of the micromodification formed during the contact mechanics test.

Figure 5:
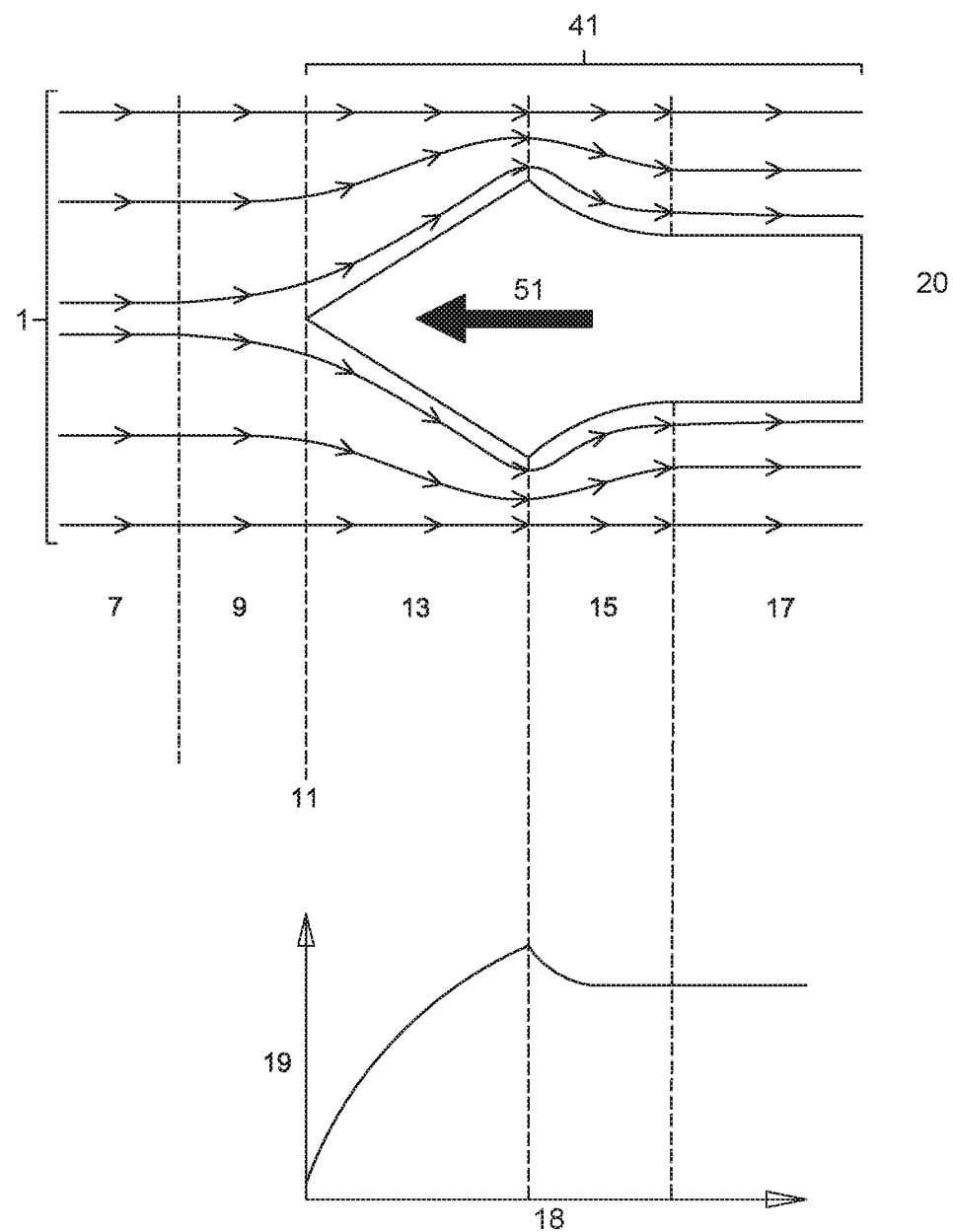
FIG. 5 is a schematic of a side view of the flow of material on a certain section of a stylus with a wedge-shaped profile that induces a stretch zone, above or below the section shown, where tensile stresses are generated according to embodiments of the present invention.
Figure 6:
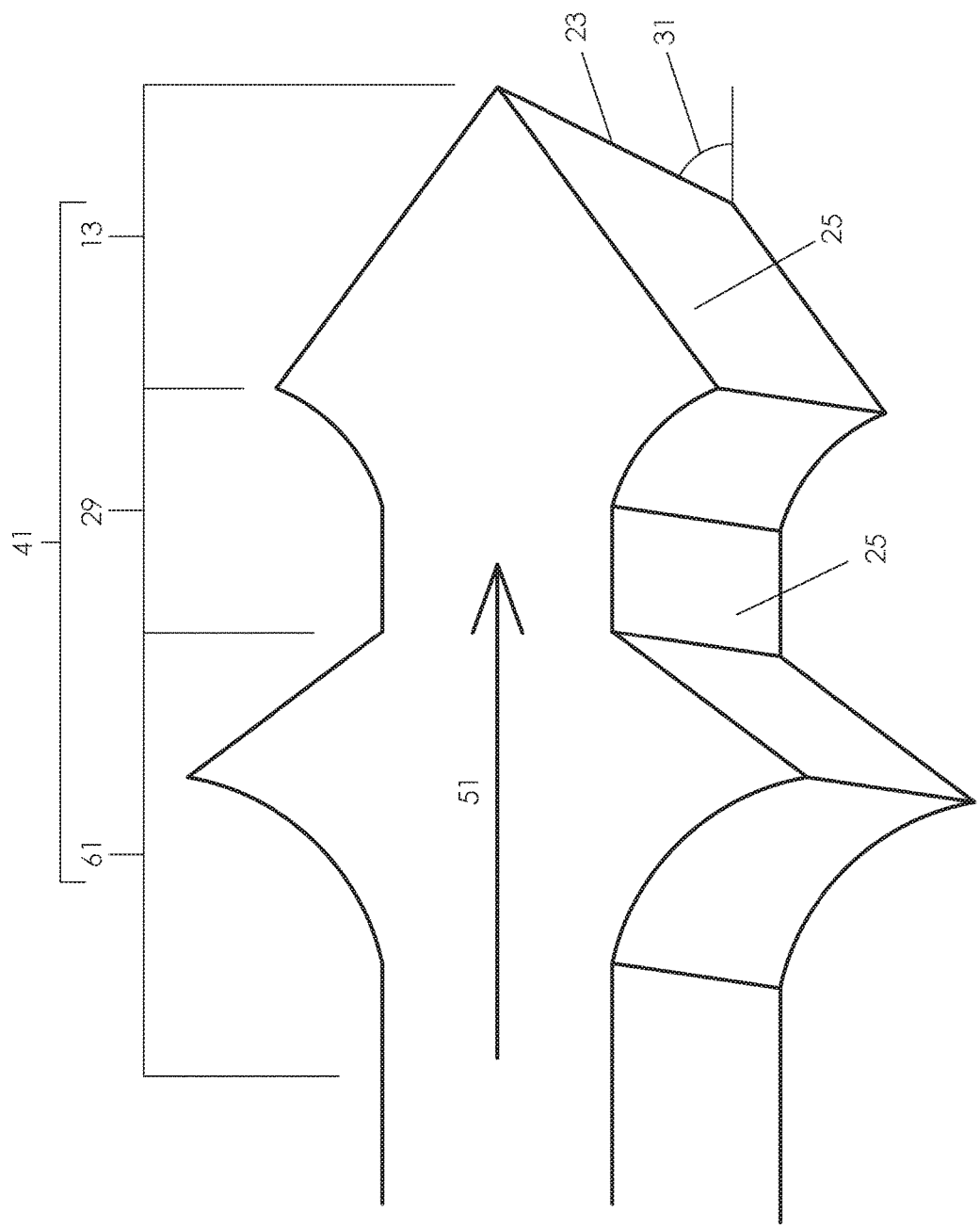
FIG. 6 is a schematic of a perspective side view of a stylus having a wedge-shaped profile with a stretch zone in the transverse direction with multiple loading cycles according to the embodiments of the present invention.

Provided in one embodiment, as shown in FIG. 6, is a stylus with a contact profile that would operate under the process described in FIG. 5. When the stylus engages with a substrate, the attack angle 59 formed between the stylus and substrate controls the magnitude of stress and deformation. A larger attack angle 59 results in greater stresses and average plastic strain. For materials with certain mechanical properties, there will be a transition between a ductile plowing response and a brittle machining (e.g. chipping) response based on the attack angle 59 and contact conditions (e.g. coefficient of friction). The attack angle 59 can be constant for a conical or pyramidal geometry, or vary with depth as with a spherical or elliptical geometry. The stylus shown in FIG. 6 has a leading edge 23 and trailing faces 25 that make up a stretch zone 13 that progressively increases the separation between the two zones of flow of material on each side of the contact profile 41 to induce a micromodification in the transverse direction to the stylus path trajectory 51. A material with a greater resistance to micromodification initiation and propagation will reach a greater attack angle along the stretch zone before the micromodification occurs. After the stretch zone is an option preserving zone 29. In this embodiment, an optional secondary contact profile 61, which will repeat the stretch and relaxation deformation again, resulting in additional deformation mechanics, such as material fatigue.

Figure 7B:
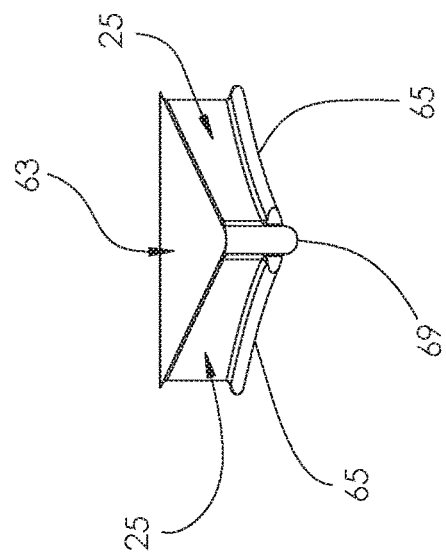
FIG. 7A-C are schematics of side, front, and bottom views, respectively, of a stylus capable of initiating micromodifications by generating a multi-axial tensile stress state according to embodiments of the present invention.
Figure 7A:
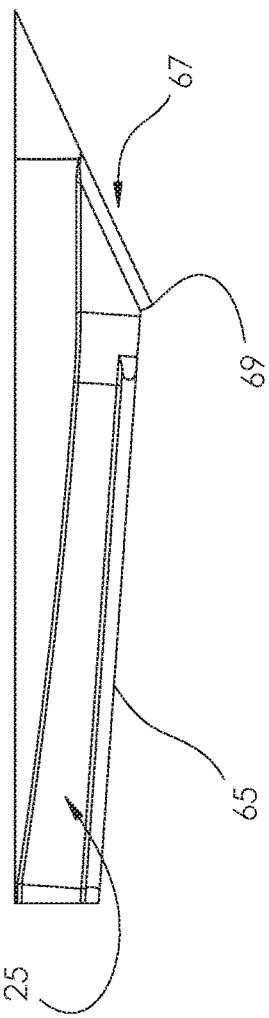
Figure 7C:
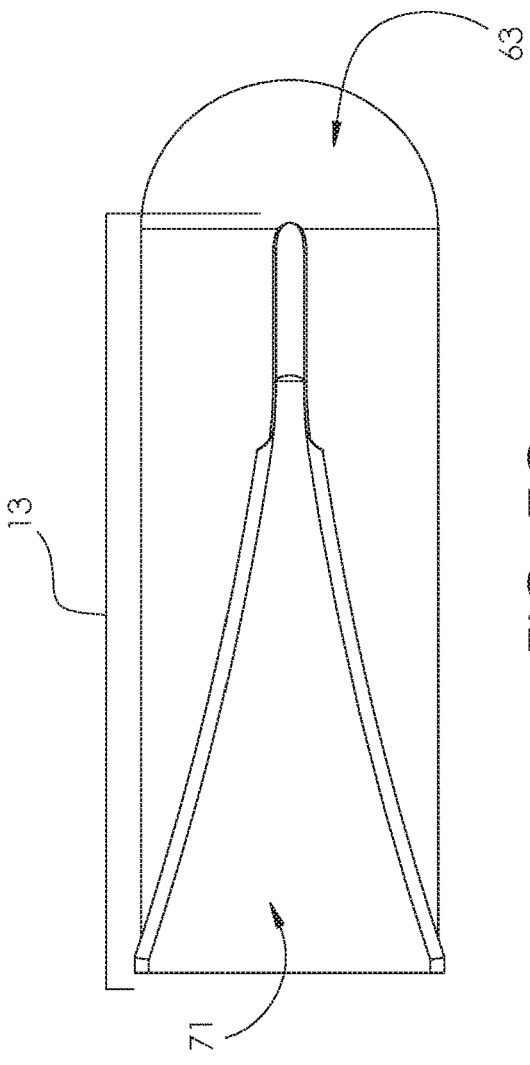

Another embodiment of a stylus that operates under similar mechanics to those described in FIG. 5 is shown in FIG. 7A-C. The stylus contains a stretch zone 13 which includes a ploughing surface 63 and trailing faces 25. The stretch zone 13 promotes micromodification formation by gradually transitioning the compressive force on the ploughing surface 501 to tension forces acting normal to the trailing faces 25 and assumes that the coefficient of friction between the micromodification stylus and substrate is sufficiently high to stretch the substrate until fracture. Flow control ridges 65 may be used to increase the effectiveness of the stretch zone 13 by manipulating the plastic flow of the substrate during a contact mechanics test. The leading face 67 has a curved front face and extrusion 69 to ensure fracture occurs beneath the bottom surface 71.

Specific Embodiments of System Components

In order to displace the stylus along the desired path trajectory, at least one engagement mechanism may be coupled to the stylus by a transfer member. The engagement mechanism may push or pull the stylus along the desired path trajectory, depending on the parameters of the contact mechanics test. The transfer member must be selected based on the manner of displacement, and may be a combination of rotational and translational attachments which allow for the necessary motions. According to an exemplary embodiment, the apparatus is configured such that one or more engagement mechanisms may transmit translational, rotational, or a combined translational and rotation motion to the stylus while the stylus may move independently of the engagement mechanism at a local angular orientation to the substrate surface. According to an exemplary embodiment, the driving forces are applied with translational or rotational actuators operating along the desired path trajectory. The actuators may be any suitable mechanism (e.g., mechanical, hydraulic, pneumatic, electro-magnetic, etc.) capable of providing a sufficient force to overcome the reaction forces of the stylus engaging the substrate surface. The one or more engagement mechanisms may be operated at multiple translational velocities, which will impose different strain rates into the substrate for a contact mechanics test.

According to the exemplary embodiment, the apparatus may include an alignment mechanism which establishes the position and/or local angular orientation of the stylus relative to an irregular substrate surface. The alignment may be accomplished through contact referencing, which is when the alignment mechanism utilizes two or more floats which contact the substrate surface outside of the area engaged by the stylus in order to orient the stylus relative to the substrate surface. The floats are connected to the stylus by means of coupling members, which may be separate components or contiguous with the contacting elements of the stylus. In addition to or independently of alignment, the floats may serve as safety limits to prevent the stylus from penetrating too deep during a contact mechanics test. The alignment may also be accomplished by electronic controls, such as limit switches, which recognize the relative orientation of the stylus and activate mechanical systems to correct the path trajectory.

Figure 8A:
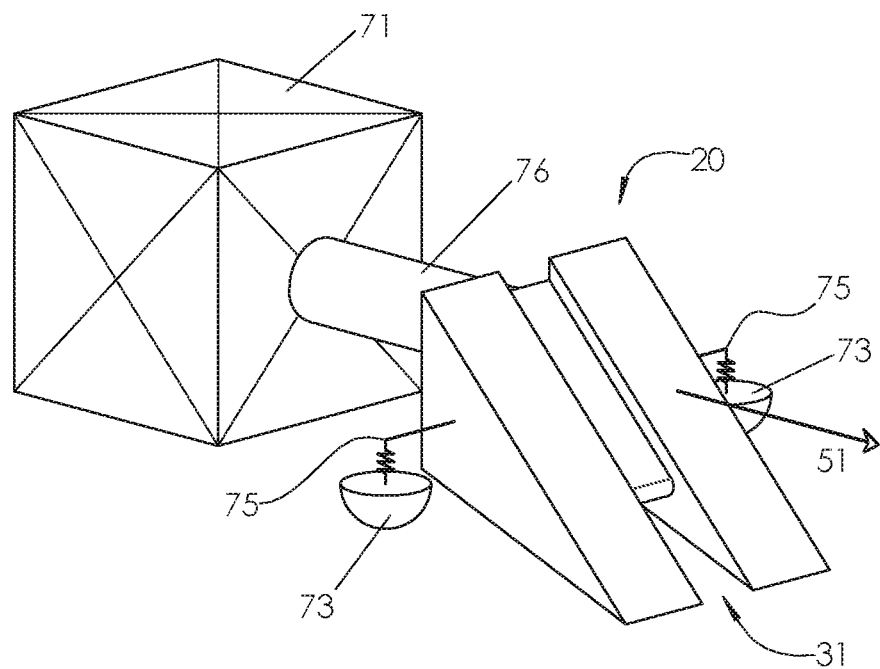
FIG. 8A-B are schematics of isometric and side views, respectively, of a stylus, drive mechanism, and alignment mechanism with floats capable of displacing and orienting the stylus, according to embodiments of the present invention.
Figure 8B:
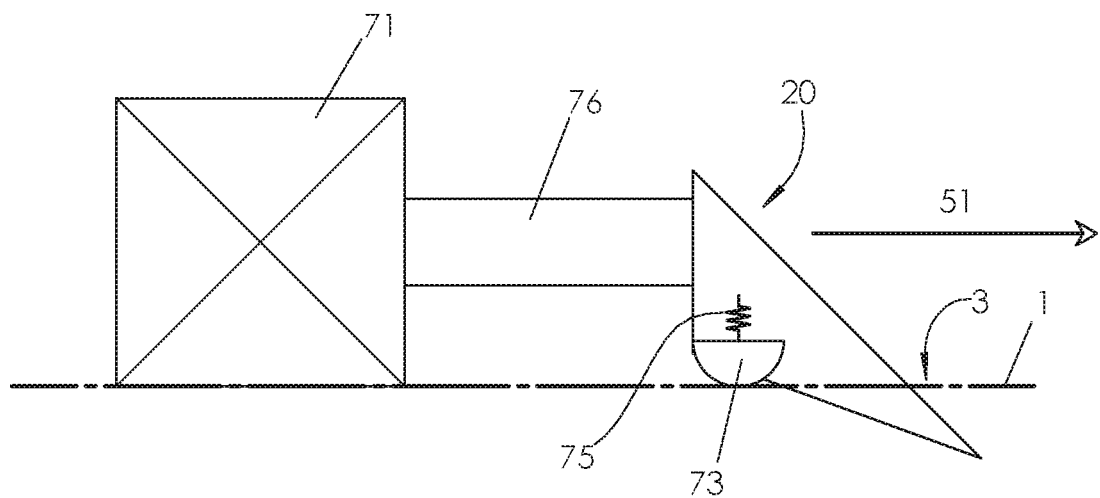

Referring to FIG. 8A-B, a stylus 20 containing a stretch passage 31 is shown with an exemplary engagement mechanism 71 and alignment mechanism 73, 75. In this embodiment, the engagement mechanism 71 is coupled to the stylus 20 by a rigid transfer member 76, and is configured to push the stylus along a linear path trajectory 51, and may include any translational actuator with sufficient force to overcome the reaction forces caused by the stylus 20 engaging the substrate material 1. In addition, the alignment mechanism consists of two floats 73, coupled to the stylus by coupling members 75, such that the prescribed local orientation of the stylus 20 with respect to the substrate surface 3 is maintained throughout the contact mechanics test.

The combination of engagement mechanism 71 and alignment mechanism selected may be used to designate the ability of the apparatus to perform in a stationary laboratory environment or in a portable field environment. For example, if the engagement mechanism 71 is affixed to a sample configured to move the sample with respect to the stylus 20, and the alignment mechanism is configured to adjust the local substrate surface 3 of the sample with respect to the stylus, then the apparatus may be most suitable to laboratory testing of removed samples. If instead, for example, the engagement mechanism 71 mounts to a structure and is configured to move the stylus 20 with respect to the substrate surface 3, and the alignment mechanism contacts the local substrate surface and aligns the stylus to maintain the desired local orientation, then the apparatus may be most suitable to field testing of in-service assets.

Detailed Description of the Method

The novel apparatus described above enables a new method for probing micromodification resistance in substrate material when a ductile and/or brittle material is permanently deformed in tension. The material response is dependent on the material's resistance to micromodification initiation and propagation, contact conditions between the stylus and substrate, geometry of the stylus, and conditions of the test environment including temperature and rate of loading. The method generally may include 1) performing a contact mechanics test with the apparatus, 2) simultaneously or sequentially measuring characteristics of the residual substrate surface and/or reaction force on the stylus, and 3) using the measurements obtained during or after the contact mechanics test to determine substrate properties related to micromodification resistance. In some embodiments, the method may only include items 1 and 2, with test measurements being used as an index of micromodification resistance that allows for comparison between substrates tested under similar conditions. Step 3 is concerned with determining established fracture toughness properties of substrate materials, including the surface energy, fracture energy, critical energy release rate, critical stress intensity factor, critical J-integral, parameters of the R-curve (initiation or steady state), CVN and/or ductile-to-brittle transition. Additional embodiments of methods for translating the stylus through the substrate, maintaining orientation of the stylus, and measuring the characteristics of the residual substrate surface are described in U.S. Patent Application Publication Nos.: 2014/0373608, entitled "Scratch Testing Apparatus and Methods of Using Same" and 2016/0258852, entitled "Contact Mechanics Tests using Stylus Alignment to Probe Material Properties" and U.S. patent application Ser. No. 15/256,276, entitled "Contact Mechanics Tests using Stylus Alignment to Probe Material Properties" previously incorporated by reference herein.

Specific Embodiments of Contact Mechanics

Figure 9:
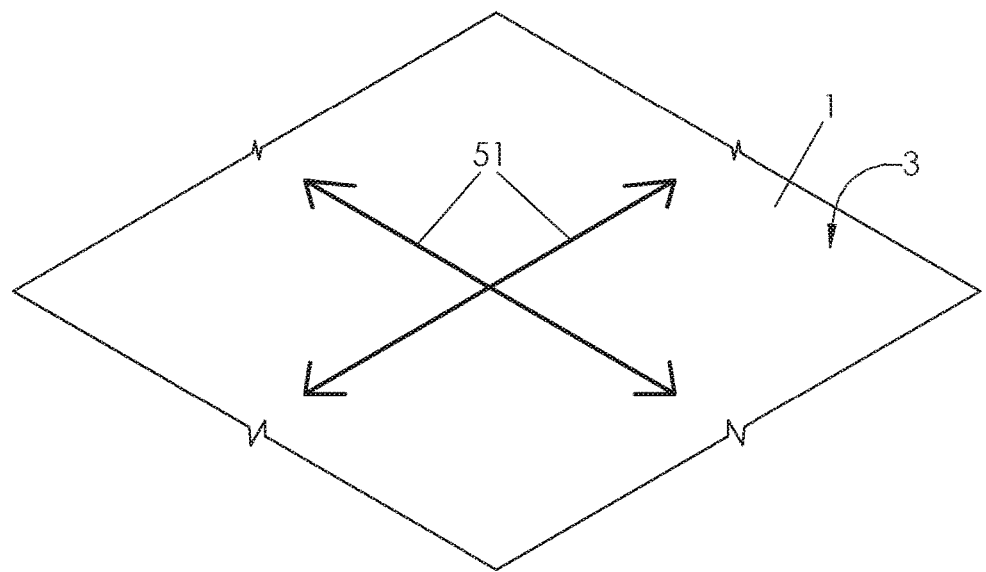
FIG. 9 is a schematic of an isometric view of a longitudinal and transverse path trajectory embodiment for a flat substrate surface according to embodiments of the present invention.
Figure 10:
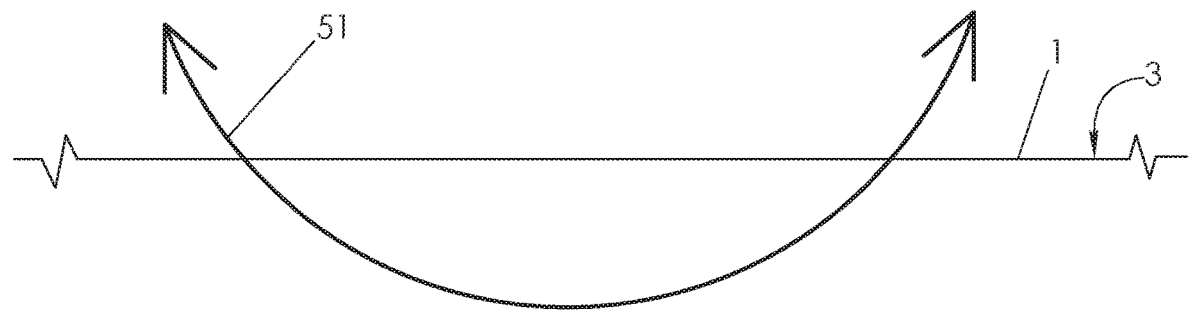
FIG. 10 is a schematic of a side view of a curved path trajectory embodiment for a flat substrate surface according to embodiments of the present invention.
Figure 11:
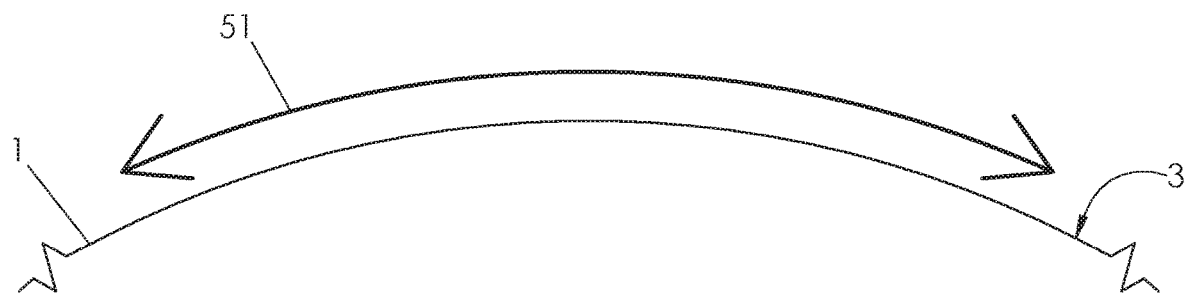
FIG. 11 is a schematic of a side view of a circumferential path trajectory embodiment for a curved or cylindrical substrate surface according to embodiments of the present invention.
Figure 12:
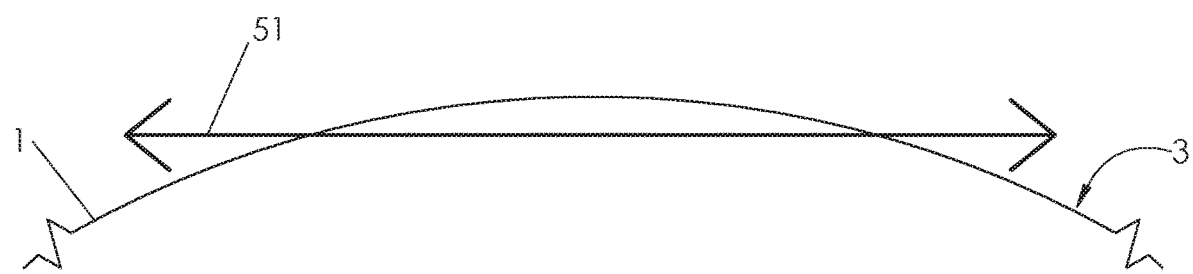
FIG. 12 is a schematic of a side view of a tangential path trajectory embodiment for a curved or cylindrical substrate surface according to embodiments of the present invention.
Figure 13:
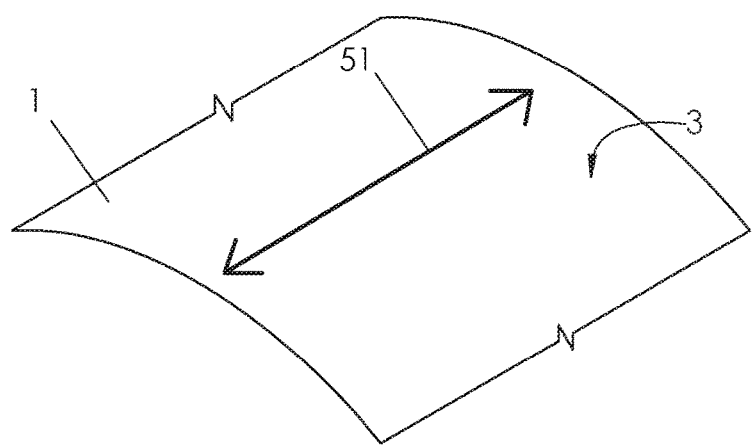
FIG. 13 is a schematic of a side view of a longitudinal path trajectory embodiment for a cylindrical substrate surface according to embodiments of the present invention.

Referring to FIGS. 9-14, depending on the properties of the substrate material 1, there exist many possible path trajectories 51 for the stylus to follow that will yield varying results. The motivation for testing in different path trajectories 51 is to probe a substrate material 1 with anisotropic resistance to micromodifications, or to simplify the equipment and material necessary for implementing the method. For embodiments of frictional sliding contact mechanics tests, the stylus may follow a path trajectory 51 that is either longitudinal or transverse, and parallel with respect to the substrate surface 3 (FIG. 9). In addition, the stylus may be set on a curved path trajectory 51, such that it enters and then exits the substrate surface 3 in an arcing motion (FIG. 10). For cylindrical, locally curved, or spherical substrate surfaces 3, the stylus may follow a path trajectory 51 roughly or exactly circumferential to the surface (FIG. 11), as well as tangentially to the radius of curvature (FIG. 12). These orientations may be maintained for planar or curved substrate surfaces 3 using the previously discussed alignment mechanisms. If the sample is locally cylindrical, such as a long pipe, the stylus can also be aligned locally perpendicular to the substrate surface 3 and follow a path trajectory 51 longitudinal to the cylinder (FIG. 13). In one embodiment of the method, only one of these possible path trajectories is followed. In another embodiment of the method, multiple path trajectories are followed sequentially. In another embodiment of the method, multiple path trajectories are superimposed to create more complex, multi-modal path trajectories.

For frictional sliding modes, the depth of penetration of the stylus beneath the substrate surface has a significant impact on the material response. Based on machining literature, depth of cut, along with cut speed and rake angle, have significant implication on the size and type of chips produces, the amount of cutting tool wear, and the amount of friction (and subsequently, heat). This is due to the deformation of the material and the energy required for fracture propagation. Based on contact mechanics, shallow cut depths require significantly less force, but ductile metals will experience significantly more plasticity through the thickness of the material on top of the contact elements. The result is a greater influence of plastic properties and greater curvature of the chip of material that separates from micromodifications. For brittle materials with low micromodification resistance and with larger penetration depths, a small-scale yielding condition can be reached, allowing for the application of linear elastic fracture mechanics (LEFM). The ability to reach a small-scale yielding condition, where the fracture process zone surrounding the micromodification is very small compared to the specimen dimensions and crack size, is dependent on the amount of material available for testing and micromodification resistance of the material. For ductile metals, elastic-plastic fracture mechanics (EPFM) are required because of the need for very large specimens and unfeasible penetration depths.

Figure 14A:
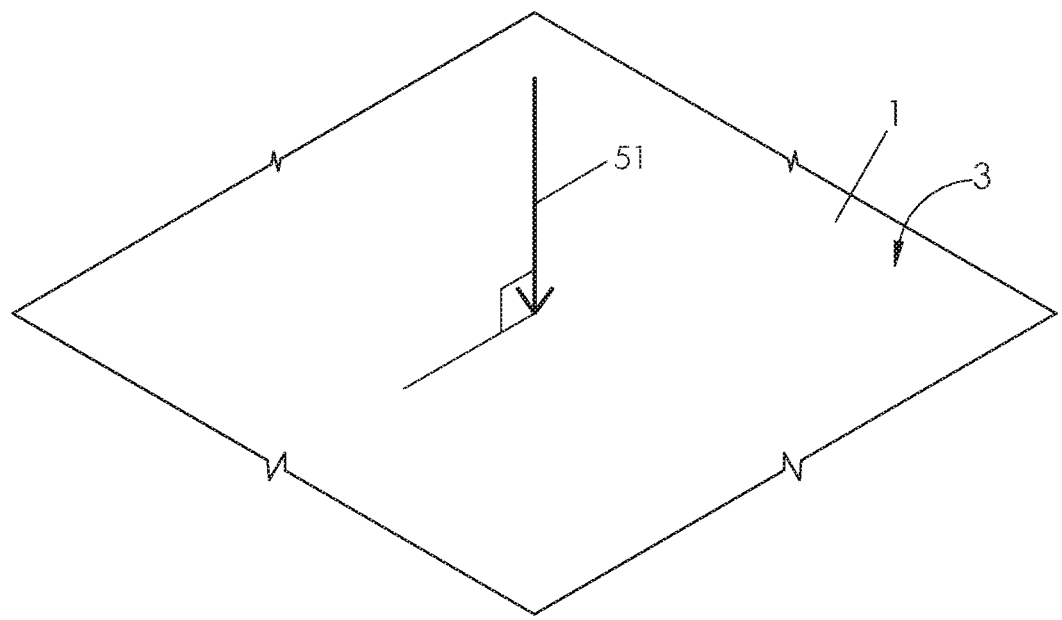
FIG. 14A-B are schematics of isometric views of an indentation path trajectory embodiment for a flat and curved or cylindrical substrate surface, respectively, according to embodiments of the present invention.
Figure 14B:
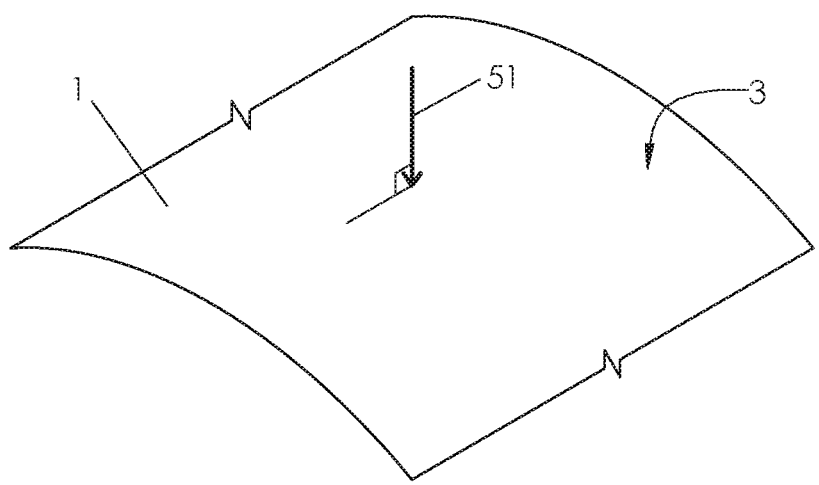
Figure 15:
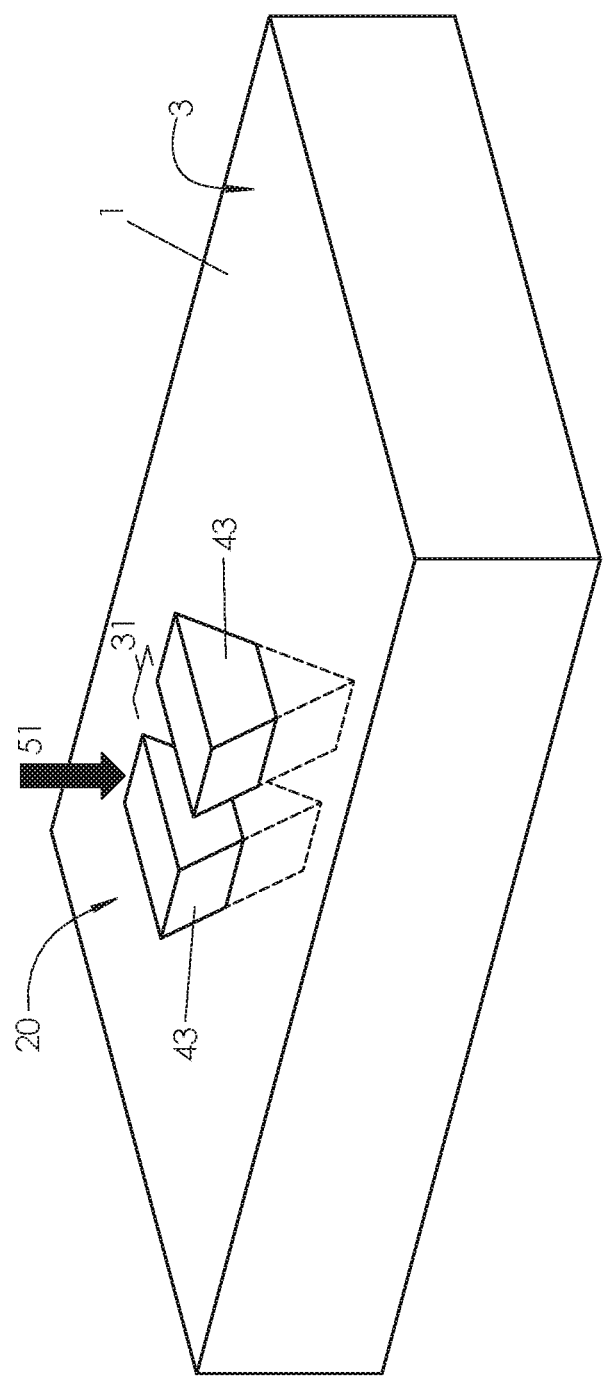
FIG. 15 is a schematic of an isometric view of an indentation contact mechanics test performed to generate micromodifications using a stylus containing two contact elements and stretch passage according to embodiments of the present invention.

An additional embodiment of a contact mechanics test is in an indentation mode as shown in FIGS. 14A-B and 15. FIG. 14A-B show a schematic overview of the path trajectory 51. For this embodiment, the stylus follows a path trajectory 51 into the substrate material 1 in a direction roughly or exactly perpendicular to the substrate surface 3. Like in a frictional sliding mode, the stylus may include a stretch passage or stretch zone, as well as a preserving zone, to create and retain the characteristics of the residual substrate surface. FIG. 15 shows a stylus 20 having two contact elements 43, which are situated in such a way to create a stretch passage 31, which are following an indentation path trajectory 51 into the substrate material 1. In this embodiment, the new surfaces and residual substrate surface are within the substrate material 1.

Specific Embodiments of Micromodification

As described above, the action of embodiments of the present apparatus and method can lead to microstructural changes and micromodifications. These include the volume fraction of each crystalline structure, crystallographic and molecular texture, the free volume in the material, the molecular arrangement, the creation of voids or other anomalies such as crazes and shear bands. A characteristic of the stylus is the ability to generate and conserve the response of the material to a deformation in tension. Other techniques have shown that contact mechanics can be used to generate cracks and damage in the material, but embodiments of the present apparatus and method described herein provide the ability to maintain and record the material signature into a controlled condition of loading. Depending on the geometry of the stylus and type of contact mechanics test (i.e. indentation or frictional sliding), the micromodification may form in different regions of the stylus. The regions include beneath the stylus, upstream of the stylus, or transverse to the stylus travel. The micromodification may be characterized by features that remain on the residual substrate surface and the dimensions of the ligament. The size, morphology, and type of micromodification depends on the material properties of the substrate being tested. Specific features that may be used to characterize the micromodification include crack lengths, shear lip offsets, surface roughness, surface area, and shear band dimensions. Both sides of a residual substrate surface containing micromodifications can be characterized. In one embodiment, the material is deformed to the point of full separation or cracking. The signature includes the amount of tensile stretch that the material underwent prior to that cracking and or the details of the residual substrate surface. One indication of micromodification resistance for ductile metals is the height of the ligament which is a function of both plastic and fracture properties. Metals have comparatively higher ligament heights if they exhibit decreased yield strengths and strain hardening exponents, or increased fracture toughness.

Figure 16:
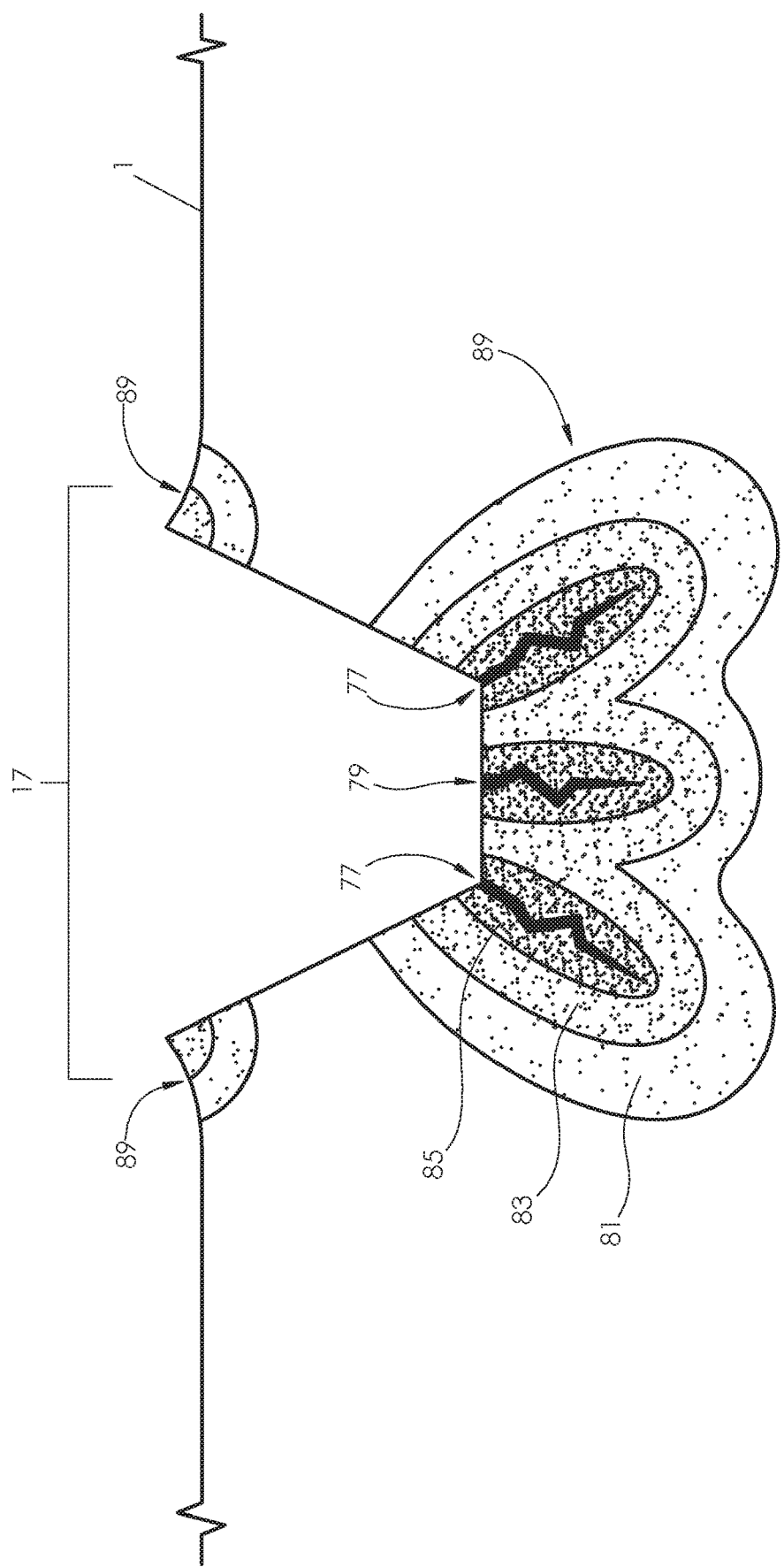
FIG. 16 is a schematic of a side view of different elements of micromodifications that may form during a contact mechanics test according to embodiments of the present invention.

FIG. 16 shows various regions of a possible micromodification following a contact mechanics test. Directly below the residual substrate surface 17, there can be side microcracks 77, central microcracks 79, or both, as shown in this embodiment. In addition, there are varying regions of plastic deformation in the substrate material 1, ranging from high deformation 81, to medium deformation 83, to low deformation 85. These areas of plastic deformation make up the plastic zone 87. In addition, there may be regions of surface deformation 89. The level of deformation correlate to the amount of microvoid formation in the material during a contact mechanics test, and are related to the region of micromodification formation.

The characteristics of the residual substrate surfaces varies significantly based on different material specimens in different test conditions. Ductile metals show indications of ductile fracture, with characteristic dimples and high surface roughness that remain due to the growth and coalescence of microvoids associated with significant plastic deformation near micromodifications. A ligament remaining on a ductile fracture surface resembles the necked section of a tensile test specimen. Brittle materials exhibit cleavage fracture that is characterized by flat planes with low roughness where very little deformation has occurred prior to micromodification propagation. A metal alloy may experience a transition from ductile to brittle fracture if a test is conducted with increasing strain rate (increased stylus velocity) or decreasing temperature.

Specific Embodiments of Measurements Methods

Figure 17:
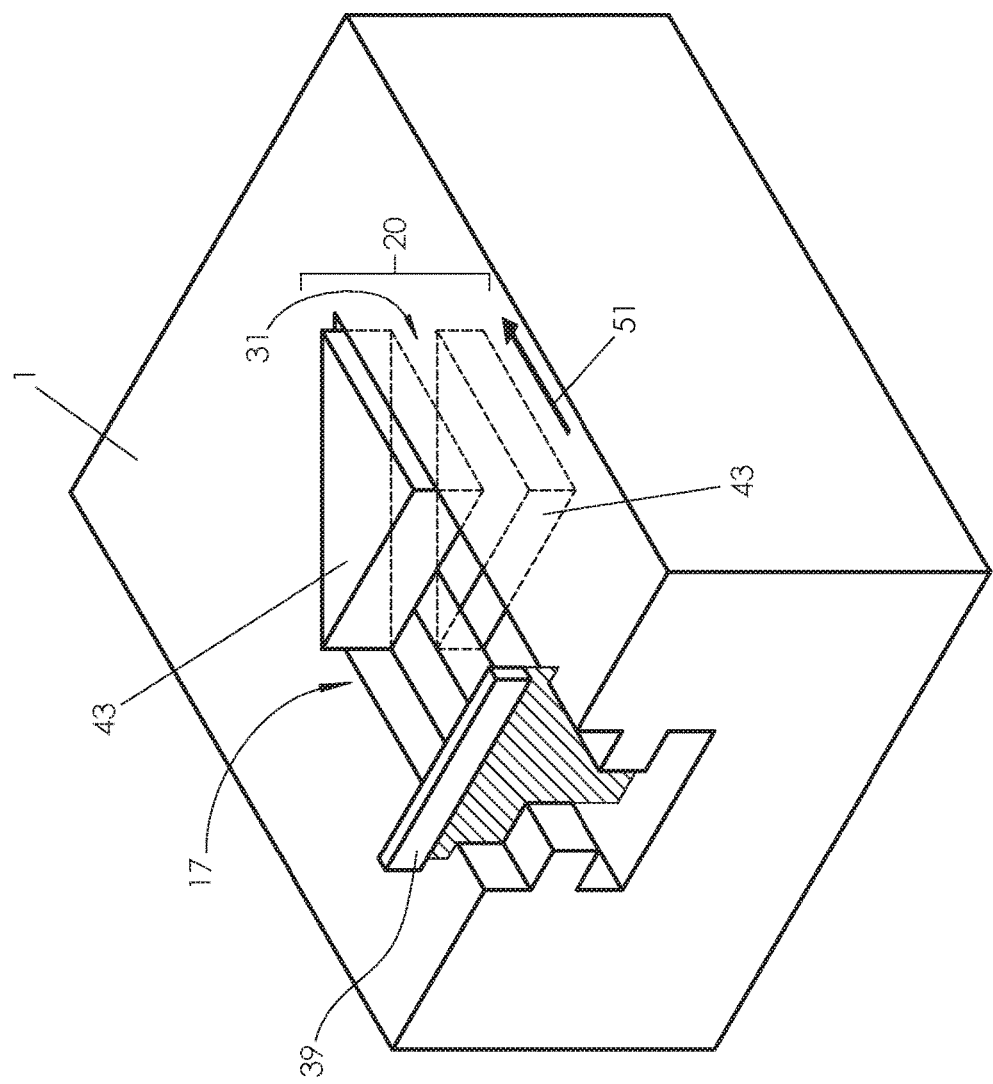
FIG. 17 is a schematic of an isometric view demonstrating a method of a frictional sliding contact mechanics test that generates micromodifications from the main tensile stress approximately in-plane with the substrate surface using a stylus with one or more wedge-shaped profiles, and the micromodifications are subsequently measured using a residual substrate surface measurement device according to embodiments of the present invention.

Referring to FIG. 17, an embodiment of the method is shown where a contact mechanics test is conducted with the stylus 20 having two contact elements 43 to induce the desired micromodification response in the substrate material 1, and the residual substrate surface 17 containing this micromodification is subsequently preserved for characterization with a residual substrate surface measurement device 39. The space prescribed between the contact elements 43 represents the stretch passage 31. Measurement can occur during the test while micromodifications are being generated or after a test has been completed.

Figure 18:
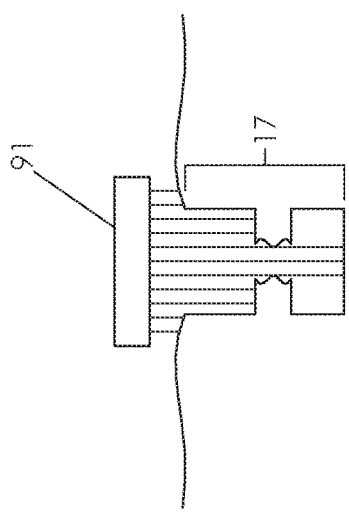
FIG. 18 is a schematic of a side view demonstrating the measurement of micromodifications in the residual substrate surface using a non-contact residual substrate surface measurement device according to embodiments of the present invention.
Figure 19:
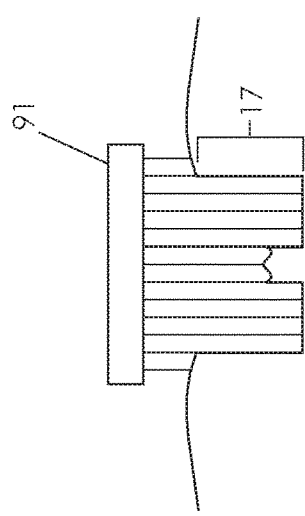
FIG. 19 is a schematic of a side view demonstrating the measurement of micromodifications in the residual substrate surface using a non-contact residual substrate surface measurement device according to embodiments of the present invention.
Figure 20:
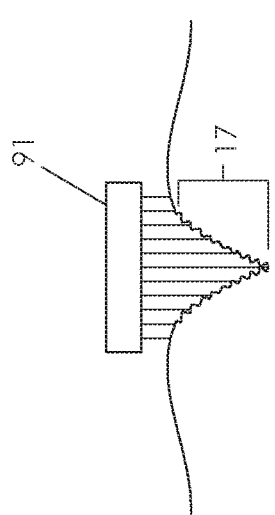
FIG. 20 is a schematic of a side view demonstrating the measurement of micromodifications in the residual substrate surface using a non-contact residual substrate surface measurement device according to embodiments of the present invention.
Figure 21:
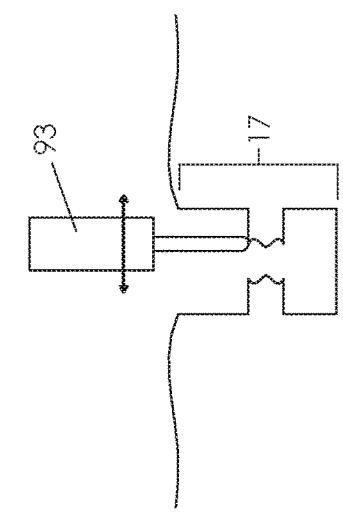
FIG. 21 is a schematic of a side view demonstrating the measurement of micromodifications in the residual substrate surface using a contact residual substrate surface measurement device according to embodiments of the present invention.
Figure 22:
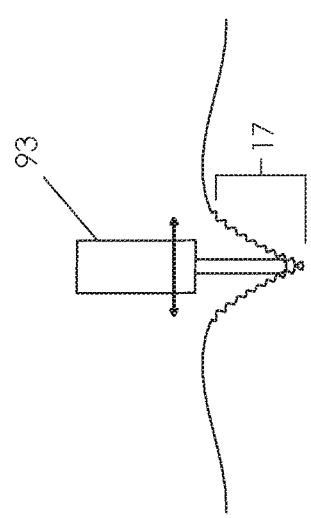
FIG. 22 is a schematic of a side view demonstrating the measurement of micromodifications in the residual substrate surface using a contact residual substrate surface measurement device according to embodiments of the present invention.
Figure 23:
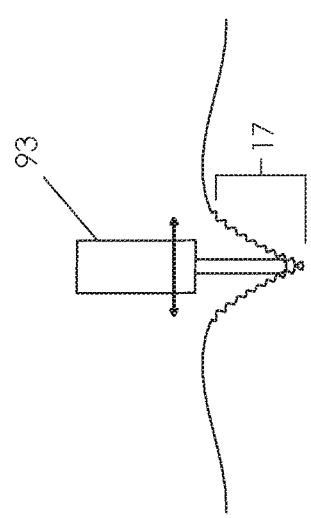
FIG. 23 is a schematic of a side view demonstrating the measurement of micromodifications in the residual substrate surface using a contact residual substrate surface measurement device according to embodiments of the present invention.

FIGS. 18-23 show multiple embodiments of residual substrate surfaces 17 containing micromodifications, along with characterization techniques utilizing contact or non-contact residual substrate surface measurement devices. FIGS. 18-20 are shown with a non-contact residual substrate surface measurement device 91, while FIGS. 21-23 are shown with a contact residual substrate surface measurement device 93. In FIGS. 18, 19, 21, and 22, micromodifications result from a stylus operating in a frictional sliding mode, with the orientation of the micromodification dependent on the stylus geometry and orientation. FIGS. 18 and 21 show residual substrate surfaces 17 from contact mechanics tests in the transverse direction of the material, whereas FIGS. 19 and 22 show residual substrate surfaces 17 from contact mechanics tests in the short transverse direction, which is perpendicular to the substrate surface. In one embodiment, styluses are used to measure the directional material properties of the substrate, allowing for measurement of longitudinal, transverse, and short transverse micromodification resistance. FIGS. 20 and 23 show residual substrate surfaces 17 which are specific to indentation mode contact mechanics tests. The residual substrate surface measurement device may include optical instruments like laser interferometery and/or contact instruments like profilometers. In addition, the residual substrate surface measurement devices shown in FIGS. 18-23 can also be inclined at an angle with respect to the residual substrate surface 17 to allow for greater access of the fracture surfaces. These residual substrate surface measurement devices probe specific characteristics of the micromodification on both sides of a residual substrate surface, such as surface roughness, crack length, and surface area. A micromodification may also be examined using microscopy or metallurgy. Both sides of the residual substrate surface associated with a micromodification may be investigated.

In some embodiments of the method, the reaction forces on the stylus are monitored with respect to one or more local orientations. The reaction forces may be monitored for the entire contact mechanics test, or for only a limited portion. The forces on the stylus may also be applied, as a constant force or a force that is ramped from low-to-high to determine the instant of micromodification initiation. The forces on the stylus may be combined with analytical or numerical calculations of the stylus interaction with the substrate to determine the equivalent crack driving force being applied to the material. The crack driving force at the instant of micromodification propagation is associated with the fracture toughness of the material.

Specific Embodiments of Micromodification Property Correlation

The measurements of characteristics of the micromodification obtained from a residual substrate surface and/or the reaction forces on the stylus can be related to the material properties of the substrate. This includes the fracture toughness properties, such as stress intensity factor, energy release rate, J-integral, surface energy, fracture energy, R-curve parameters and CVN. Specific modes can also be investigated, such as the Mode I (tension mode) of cracking, which is highly correlated to the Crack Tip Opening Displacement (CTOD) and Crack Tip Opening Angle (CTOA). In one embodiment, conditions are generated similar to the stress and strain conditions at the tip of a micromodification loaded in a combination of Mode I and Mode II (shear) loading. In another embodiment, the relative proportion of Mode I and Mode II loading contributions are quantified through analytical or numerical models of the micromodification process.

Numerical models may include finite element analysis simulations which allow for the consideration of the complete stress and strain field induced for a given material condition, coefficient of friction, and stylus geometry. In one embodiment, finite element analysis models consider material plasticity and inelasticity to determine the crack driving force for a given crack geometry, stylus geometry, and depth of penetration through J-integral calculations. In another embodiment, finite element analysis outputs values consistent with linear elastic fracture mechanics (LEFM) such as directional stress intensity factors or the critical energy release rate. By performing parametric studies on a large combination of material and contact conditions, predictive functions can be obtained through dimensional analysis by considering crack driving force as a function of experimental conditions. For ductile metals, the yield strength and strain hardening exponent would need to be known or measured through suitable means such as tensile tests, automated-ball indentation or frictional sliding. The crack driving force obtained through experimental measurements would then be the critical value associated with micromodification propagation which can be related to fracture toughness. In another embodiment, explicit damage-based finite element analysis simulations are performed which include both plastic and fracture properties of the material. This approach allows for the prediction of the dimensions of the ligament remaining on the residual substrate surface, which can be compared with experimental results. Damage-based finite element analysis simulations require a material model for damage initiation that is appropriate for the substrate material being probed, including the influence of hydrostatic stress components, stress triaxiality, maximum principal stress or strain and additional parameters. In another embodiment, strain-rate dependent material data is used to assess the influence of strain-rate on the damage response.

In another embodiment, size effects and the effect of plain strain or plane stress loading conditions may also be considered. Multiple tests can be conducted on a substrate material with varying stretch passage dimensions which control the amount of hydrostatic stresses and constraint within the ligament of material experiencing micromodifications. Another embodiment is to perform frictional sliding tests with the stylus at multiple penetration depths beneath the surface of the underformed substrate. With increasing penetration depth, greater constraint is placed on the material experiencing micromodifications. Depending on the substrate fracture toughness, plane strain conditions and/or small-scale yielding conditions could be achieved for large stretch passage width and depth on penetration.

In one embodiment, the forces on the stylus required for machining are separated from the forces required for micromodification separation by performing a contact mechanics test using two styluses, with identical overall geometry, but with one stylus containing a stretch passage and one without. The stylus without the stretch passage would measure the force required to machine the material, and the stylus with the stretch passage would measure the force required to machine and separate the material. For similar contact conditions, the force of separation is then decoupled. In another embodiment, frictional sliding tests are performed at multiple penetration depths with the machining stylus, so that the machining force as a function of penetration depth can be obtained. The stylus with the stretch passage can then be used to test at any penetration depth within the limits of the machining force vs. depth function.

In addition to predictive functions obtained through numerical or analytical means, empirical functions can be derived using a database of testing results. This allows for a direct relation between the response measured in the contact mechanics test with the value obtained from a bulk experiment. Bulk experiments include fracture toughness tests in Mode I or Mode II loading and Charpy V-notch values. Dimensional analysis can then be used to relate the bulk experiments with the micromodification characteristics from contact mechanics.

Although the above discussion discloses various exemplary embodiments of the invention, it should be apparent that those skilled in the art can make various modifications that will achieve some of the advantages of the invention without departing from the true scope of the invention.

What is claimed is:

1. An apparatus for performing a contact mechanics test in a substrate, the apparatus comprising:
   a stylus having at least two contact elements configured to engage with the substrate, each contact element having a contact profile, the at least two contact elements spaced apart to define a stretch passage between the at least two contact elements; and
   a system configured to move the stylus laterally along a substrate surface as the at least two contact elements deform the substrate, the stylus configured to separate the substrate to form a ligament in the stretch passage when the substrate flows between the at least two contact elements and configured to induce tension in the ligament due to opposing forces of the at least two contact elements and the substrate to generate and preserve micromodifications in the substrate.

2. The apparatus of claim 1, wherein the stylus is further configured to de form the substrate in multiple orientations, the multiple orientations including (a) an opening that is either normal or transverse to an undeformed surface of the substrate as the stylus travels parallel to the undeformed surface, and/or (b) an opening that is normal or transverse to the direction of travel during an indentation mode.

3. The apparatus of claim 1, further comprising an engagement mechanism coupled to the stylus and configured to provide movement of the stylus in a frictional sliding mode or indentation mode.

4. The apparatus of claim 1, further comprising:
   at least one engagement mechanism coupled to the stylus and configured to provide movement of the stylus; and
   an alignment mechanism coupled to the at least one engagement mechanism and configured to establish an orientation and/or position of the stylus relative to the substrate.

5. The apparatus of claim 1, further comprising:
   at least one engagement mechanism coupled to the stylus and configured to provide movement of the stylus; and
   a substrate surface measurement device, coupled to one or more of the at least one engagement mechanism, to measure characteristics of the substrate surface associated with the micromodifications as the stylus travels.

6. A method for performing a contact mechanics test the method comprising:
   providing the apparatus of claim 1;
   causing the stylus to engage against the substrate; and
   moving the stylus to perform the contact mechanics test to generate a residual substrate surface in the substrate and to preserve the residual substrate surface.

7. The method of claim 6, further comprising measuring characteristics of the residual substrate surface associated with deforming the substrate.

8. The method of claim 6, further comprising measuring reaction forces on the stylus as the stylus deforms the substrate.

9. The method of claim 6, further comprising:
   providing a second stylus without a stretch passage;
   causing the second stylus to engage against the substrate; and moving the second stylus to generate a substrate response.

10. The method of claim 6, further comprising:

measuring characteristics of the substrate surface associated with deforming the substrate or measuring reaction forces on the stylus; and utilizing the measurements of the residual substrate surface and/or the reaction forces in predictive algorithms to determine mechanical properties of the substrate related to its resistance to micromodification initiation and propagation.

11. The method of claim 10, further comprising using plastic material properties in determining mechanical properties of the substrate.

12. The method of claim 6, further comprising:

measuring characteristics of the substrate surface associated with deforming the substrate or measuring reaction forces on the stylus; and using the measurements of the substrate surface and/or the reaction forces to compare with numerical models that characterize a stress-strain field based on material properties and stylus geometry to develop predictive algorithms.

13. The method of claim 6, further comprising:

measuring characteristics of the substrate surface associated with deforming the substrate; and using an empirical database to associate the measurements of the substrate surface with mechanical properties of the substrate.

14. The method of claim 6, further comprising using temperature and/or stylus velocity to determine a ductile-to-brittle transition.

15. The method of claim 6, further comprising repeating the causing and moving steps of claim 6 with different stylus penetration depth and/or stretch passage width to assess influence of material constraint on the substrate related to the mechanical properties of the substrate.

16. The method of claim 6, further comprising moving the stylus to perform the contact mechanics test on the substrate in an indentation mode.

* * * * *